(12) United States Patent
Kashiwagi et al.

(10) Patent No.: US 7,954,967 B2
(45) Date of Patent: Jun. 7, 2011

(54) DIRECTIONAL BACKLIGHT, DISPLAY APPARATUS, AND STEREOSCOPIC DISPLAY APPARATUS

(75) Inventors: Masako Kashiwagi, Kanagawa (JP); Tatsuo Saishu, Tokyo (JP); Rieko Fukushima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 12/195,683

(22) Filed: Aug. 21, 2008

(65) Prior Publication Data

US 2009/0052164 A1 Feb. 26, 2009

(30) Foreign Application Priority Data

Aug. 24, 2007 (JP) .................... 2007-218499

(51) Int. Cl.
G09F 13/04 (2006.01)
(52) U.S. Cl. ....... 362/97.1; 362/234; 362/561; 362/627; 349/158; 349/161; 349/200
(58) Field of Classification Search ........ 362/97.1–97.4, 362/230, 234, 561, 600, 606, 608, 627; 349/158, 349/161, 200
See application file for complete search history.

(56) References Cited

U.S. PATENT DOCUMENTS

| | | | |
|---|---|---|---|
| 2002/0001045 A1 | 1/2002 | Ranganath et al. | |
| 2005/0083400 A1* | 4/2005 | Hirayama et al. | 348/14.07 |
| 2005/0190329 A1 | 9/2005 | Okumura | |
| 2006/0238863 A1 | 10/2006 | Saishu | |
| 2007/0195410 A1 | 8/2007 | Yun et al. | |

FOREIGN PATENT DOCUMENTS

| | | |
|---|---|---|
| CN | 1661421 A | 8/2005 |
| JP | 3585781 | 8/2004 |
| JP | 3710934 | 8/2005 |
| JP | 2006-267928 | 10/2006 |

OTHER PUBLICATIONS

Hoshino et al.; "Analysis of Resolution Limitation of Integral Photography", J. Opt. Soc. Am. A, vol. 15, No. 8, pp. 2059-2065, (1998).
Notification of the First Office Action issued by the Chinese Patent Office on Oct. 16, 2009, for Chinese Patent Application No. 200810210006.6, and English-language translation thereof.

* cited by examiner

*Primary Examiner* — Stephen F Husar
*Assistant Examiner* — Meghan K Dunwiddie
(74) *Attorney, Agent, or Firm* — Finnegan, Henderson, Farabow, Garrett & Dunner, L.L.P.

(57) ABSTRACT

A stereoscopic display apparatus includes a liquid-crystal display device that has display pixels arranged in a matrix and displays an elemental image array formed from a plurality of field images on the display pixels to render stereoscopic display, a parallax creating unit provided on the front surface or the rear surface of the liquid-crystal display device, and a directional backlight that emits light through the liquid-crystal display device then through the parallax creating unit and switches directions of the thus-emitted light among a plurality of directions according to a display of the field image is disclosed.

15 Claims, 17 Drawing Sheets

FIG.3
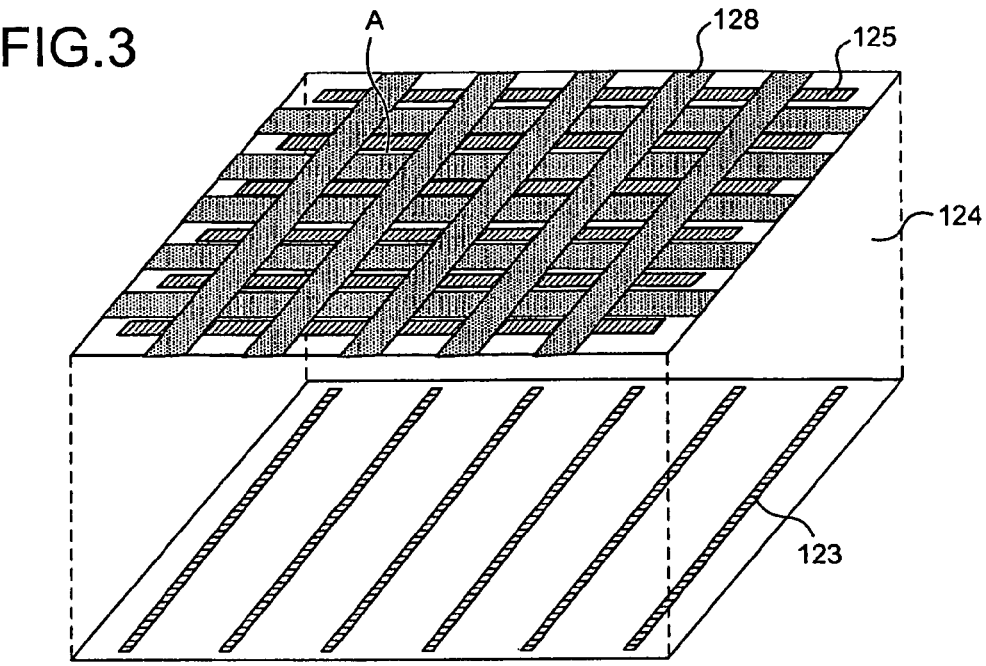
FIG.4
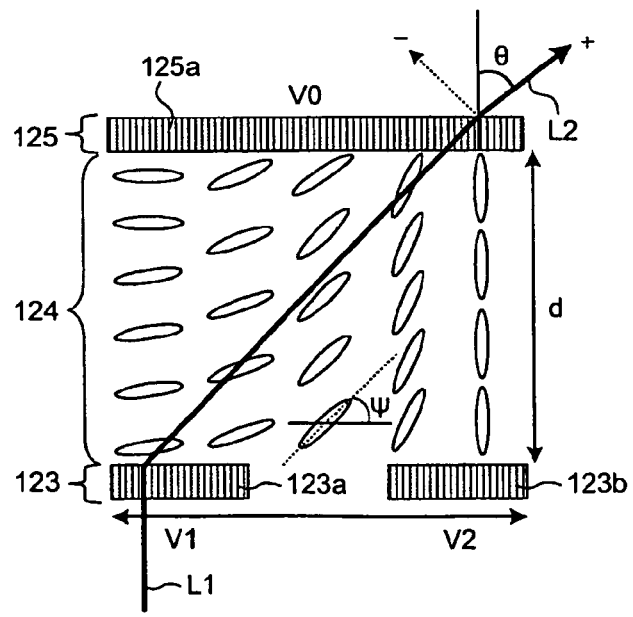
FIG.5
| MAGNITUDE RELATION AMONG VOLTAGE VALUES | DIRECTION OF ANGLE θ |
|---|---|
| \|V1\|>\|V2\|=\|V0\| | + |
| \|V0\|=\|V1\|=\|V2\| | 0 |
| \|V0\|=\|V1\|<\|V2\| | − |

200(213)

LUMINANCE

DIRECTIONAL BACKLIGHT, DISPLAY APPARATUS, AND STEREOSCOPIC DISPLAY APPARATUS

CROSS-REFERENCE TO RELATED APPLICATIONS

This application is based upon and claims the benefit of priority from the prior Japanese Patent Application No. 2007-218499, filed on Aug. 24, 2007; the entire contents of which are incorporated herein by reference.

BACKGROUND OF THE INVENTION

1. Field of the Invention

The present invention relates to a directional backlight, a display apparatus and a stereoscopic display apparatus using the directional backlight.

2. Description of the Related Art

Various systems for implementing stereoscopic display apparatuses, or three-dimensional (3D) image display apparatuses, capable of displaying three-dimensional moving images are known. In recent years, demands for stereoscopic display systems that use a flat panel and do not require special glasses have been increased particularly. A relatively easily implementable system that provides a parallax creating unit is known. The parallax creating unit is provided in immediate front of a display panel (display device) whose pixels are positionally fixed, and controls directions of light rays emitted from the display panel toward an observer. Examples of such a display panel include direct-view type and projection type liquid crystal displays and plasma displays.

The parallax creating unit is generally called a parallax barrier, and controls light rays such that an observer sees different views from different viewing angles even when the image viewed by the observer is at same locational position on a light-ray control device. Specifically, to create only lateral parallax (horizontal parallax), a slit sheet or a lenticular sheet (cylindrical lens array) is employed as the parallax creating unit. To create longitudinal parallaxes (vertical parallaxes) in addition to horizontal parallax, a pinhole array or a lens array is used as the parallax creating unit.

Systems that use a parallax barrier are further classified into a binocular display, a multi-view display, a super multi-view display (multi-view display using a super multi-view condition), and integral imaging (hereinafter, IP system, which is an abbreviation of integral photography). The basic principle of these systems is substantially identical with that was invented about 100 years ago and has been used in stereophotography.

As described in Journal of the Optical Society of America A, Vol. 15, No. 8, pp. 2059-2065 (1998) and in JP-A 2006-267928 (KOKAI), in the multi-view display and the one-directional (1D) IP system (horizontal-parallax-only IP system), a trade-off relation among three properties; that is, parallax, resolution, and apparent depth makes it difficult to attain adequate levels in all the three properties. To solve this problem, techniques for improving resolution by changing directions of light rays using time-division control are proposed in Japanese Patent No. 3585781 and Japanese Patent No. 3710934.

However, these conventional techniques are disadvantageous in that increasing the number of directions of light rays and decreasing the number of light sources to be switched by the time-division control are not favorably compatible, which makes it difficult to respond to changes in viewing location.

SUMMARY OF THE INVENTION

According to one aspect of the present invention, a directional backlight includes a surface light source having a characteristic that luminance distribution of light rays emitted from a light-emitting surface of the surface light source are concentrated close to the normal direction of the light-emitting surface; a polarizing device unit that includes a first transparent substrate that faces the light emitting surface of the surface light source, a second transparent substrate that faces the first transparent substrate, a pair of electrodes that are formed between the first transparent substrate and the second transparent substrate, the electrodes having wiring patterns arranged in stripes, a liquid crystal layer retained between the electrodes, and a light-shielding layer that is provided on the second transparent substrate and has a plurality of openings corresponding to the wiring patterns of the electrode; and a voltage controller that switches a voltage application state of each of the wiring patterns of the electrode among a plurality of voltage application states and individually controls values of voltages to be applied to the wiring patterns in each of the voltage applications states, thereby controlling a direction of light rays emitted from the surface light source and passing through the openings toward a predetermined position.

According to another aspect of the present invention, a display apparatus includes a surface light source having a characteristic that luminance distribution of light rays emitted from a light-emitting surface of the surface light source are concentrated close to the normal direction of the light-emitting surface; a polarizing device unit that includes a first transparent substrate that faces the light emitting surface of the surface light source, a second transparent substrate that faces the first transparent substrate, a pair of electrodes that are formed between the first transparent substrate and the second transparent substrate, the electrodes having wiring patterns arranged in stripes, a liquid crystal layer retained between the electrodes, and a light-shielding layer that is provided on the second transparent substrate and has a plurality of openings corresponding to the wiring patterns of the electrode; a liquid-crystal display device that faces the polarizing device unit and displays a frame of image divided into a plurality of field images on display pixels arranged in a matrix; synchronization controller that performs switching of each of the field images displayed on the liquid-crystal display device to another field image at predetermined time intervals; and a voltage controller that switches a voltage application state of each of the wiring patterns of the electrode among a plurality of voltage application states according to timing of the switching performed by the synchronization controller, and individually controls values of voltages to be applied to the wiring patterns in each of the voltage applications states, thereby controlling a direction of light rays emitted from the surface light source and passing through the openings and then through the liquid-crystal display device toward a predetermined position.

According to still another aspect of the present invention, a stereoscopic display apparatus includes a surface light source having a characteristic that luminance distribution of light rays emitted from a light-emitting surface of the surface light source are concentrated close to the normal of the light-emitting surface; a polarizing device unit that includes a first transparent substrate that faces the light emitting surface of the surface light source, a second transparent substrate that faces the first transparent substrate, a pair of electrodes that are formed between the first transparent substrate and the second transparent substrate, the electrodes having wiring patterns arranged in stripes, a liquid crystal layer retained between the electrodes, and a light-shielding layer that is provided on the second transparent substrate and has a plurality of openings corresponding to the wiring patterns of the electrode; a liquid-crystal display device that faces the polarizing device unit and displays an elemental image array for rendering stereoscopic display formed from a plurality of field images on display pixels arranged in a matrix; a parallax creating unit provided on any one of a front surface and a rear surface of the liquid-crystal display device; and a voltage controller that switches a voltage application state of the wiring patterns of the electrode among a plurality of voltage application states according to a display of the field image, and individually controls values of voltages to be applied to the wiring patterns in each of the voltage applications states, thereby controlling a direction of light rays emitted from the surface light source and passing through the openings, through the liquid-crystal display device, and then through the parallax creating unit toward a predetermined position.

BRIEF DESCRIPTION OF THE DRAWINGS

FIG. 3 is an enlarged schematic diagram illustrating a portion an electrode unit of the directional backlight;

FIG. 4 is a schematic diagram for explaining a change in refractive index of a liquid crystal layer according to the first embodiment;

FIG. 5 is a diagram illustrating relationships between applied voltage values and light deflection angles according to the first embodiment;

DETAILED DESCRIPTION OF THE INVENTION

Exemplary embodiments of a directional backlight, a display apparatus, and a stereoscopic display apparatus according to the present invention will be explained below in detail with reference to the accompanying drawings.

Figure 1:
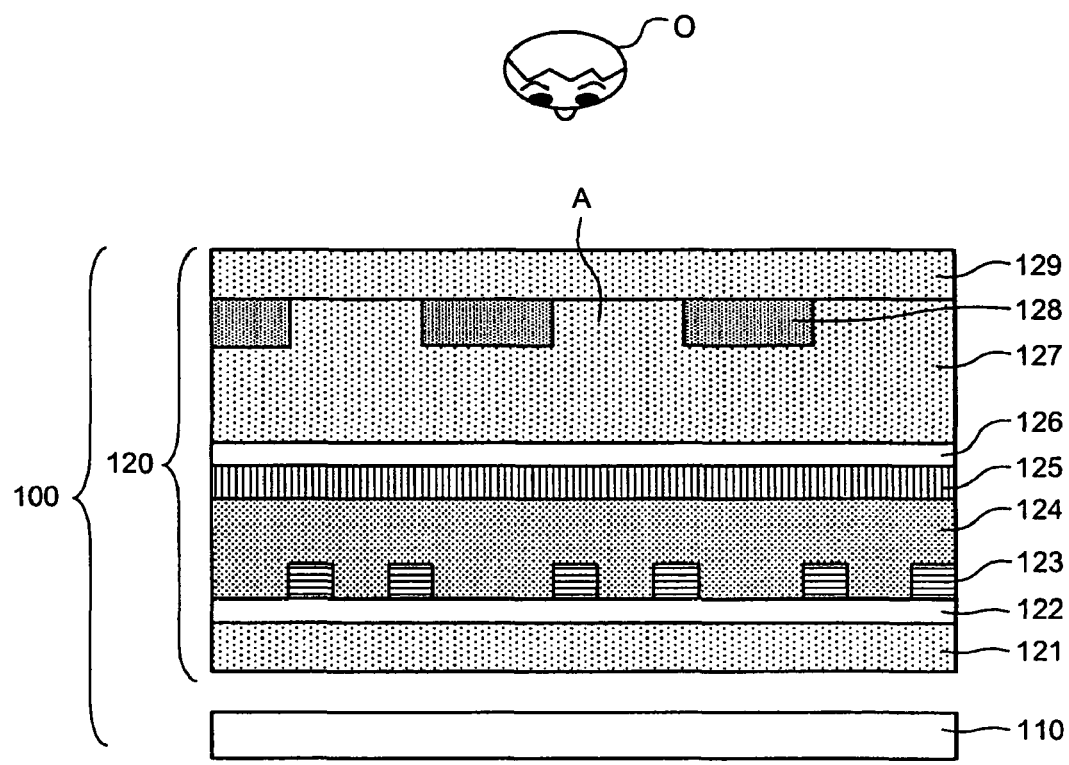
FIG. 1 is a schematic diagram illustrating a structure of a directional backlight according to a first embodiment of the present invention.

FIG. 1 is a horizontal cross-sectional diagram schematically depicting a directional backlight 100 according to a first embodiment of the present invention. In FIG. 1, an observer O is positioned on a top side, that is, the directional backlight 100 emits light to the top side. The directional backlight 100 can be any one of a flat type and a tilt type. The flat type is installed with a light-emitting surface parallel with the horizontal in a real space. The tilt type is installed in a tilted orientation relative to the horizontal such that the light-emitting surface faces the observer.

As shown in FIG. 1, the directional backlight 100 includes a surface light source 110 and a polarizing device unit 120 provided above the surface light source 110.

The surface light source 110 is a planar light source having such a directivity in luminance distribution that luminance distribution are concentrated close to the normal of a light-emitting surface of the surface light source 110. The surface light source 110 emits light toward the polarizing device unit 120 that faces the light-emitting surface, that is, toward the observer O.

Figure 2:
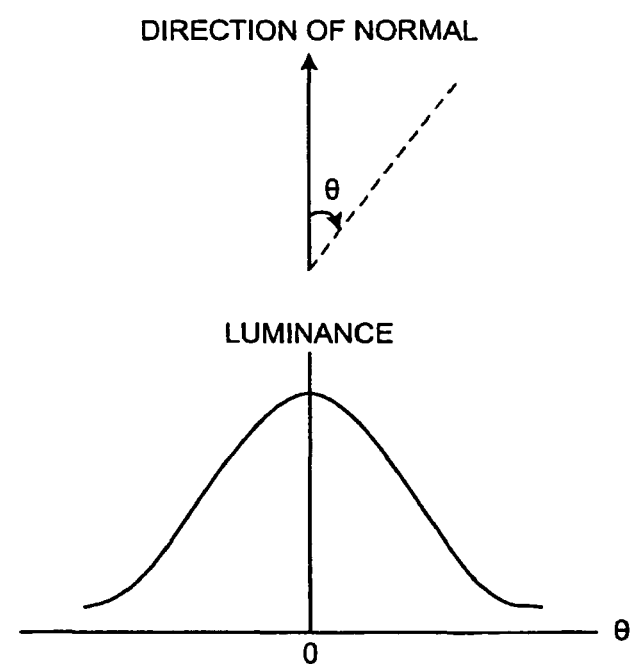
FIG. 2 is a diagram illustrating light intensity distribution of light emitted from a surface light source according to the first embodiment.

FIG. 2 depicts luminance distribution measured at different positions above the surface light source 110. As shown in FIG. 2, the luminance of light emitted from the surface light source 110 peaks in the direction of the normal of the light-emitting surface, and decreases as an angle θ relative to the normal line increases.

The polarizing device unit 120 includes a light-transmissive transparent substrate 121 that faces the light-emitting surface of the surface light source 110, a light-transmissive insulating layer 122 made of an insulator and provided on the transparent substrate 121, a lower electrode 123 having a plurality of wiring patterns, a liquid crystal layer 124 in which liquid crystal molecules are initially aligned, an upper electrode 125 having a plurality of wiring patterns, light-transmissive insulating layer 126 made of an insulator, a light-transmissive planarization layer 127, a light-shielding layer 128 made of a light-shielding material, and a light-transmissive transparent substrate 129, in the order given. The planarization layer 127 planarizes unevenness produced by the light-shielding layer 128.

In the first embodiment, the lower electrode 123 and the upper electrode 125 are provided as an electrode unit that drives the liquid crystal layer 124, however, the configuration of the electrode unit is not limited thereto. For example, the electrode unit can be implemented as an overall-surface-type electrode that is provided at least one of between the transparent substrate 121 and the insulating layer 122 and between the insulating layer 126 and the planarization layer 127. Alternatively, one of the lower electrode 123 and the upper electrode 125 can be the overall-surface-type electrode.

FIG. 3 is an enlarged schematic diagram illustrating a portion of an electrode unit of the directional backlight 100. The transparent substrate 121, the insulating layers 122 and 126, and the planarization layer 127 are not shown in FIG. 3.

As shown in FIG. 3, each of the lower electrode 123 and the upper electrode 125 includes the wiring patterns arranged in stripes. The stripes of the wiring patterns that form the lower electrode 123 and those of the wiring patterns that form the upper electrode 125 extend perpendicular to each other. The width of each wiring pattern and a gap size between each adjacent two of the wiring patterns are not specifically limited, however, the wiring patterns are preferably equally spaced fine-pitch wiring patterns on the order of, for example, several micrometers to several tens of micrometers. Each of the lower electrode 123 and the upper electrode 125 is preferably formed from a light-transmissive, transparent electrode.

As shown in FIGS. 1 and 3, openings A are defined at regular intervals in the light-shielding layer 128, which is retained inside the planarization layer 127 (not shown), at positions corresponding to the wiring patterns of the lower electrode 123 and the upper electrode 125. Because the openings A serve as ports through which light having passed through the transparent substrate 121, the planarization layer 127, and the other elements therebetween is illuminated, light having passed through the openings A is viewed by the observer O via the transparent substrate 129.

The openings A can be defined for every gap between each adjacent two of the wiring patterns of the lower electrode 123 and the upper electrode 125, or at regular intervals of a predetermined number of the gaps. The size of the opening A is not particularly limited, however, preferably determined in accordance with the gap between each adjacent two of the wiring patterns of the lower electrode 123 and the upper electrode 125. For example, when the gap between each adjacent two of the wiring patterns is on the order of several micrometers to several tens of micrometers, the size of the openings A is preferably on the order of several micrometers to several tens of micrometers to correspond with the gap.

The liquid crystal molecules constituting the liquid crystal layer 124, which is retained between the lower electrode 123 and the upper electrode 125, are longitudinally aligned in an initial state unaffected by an electric field. The orientation of each of the liquid crystal molecules constituting the liquid crystal layer 124 is changed in accordance with values of voltages applied to the wiring patterns of the lower electrode 123 and the upper electrode 125, thereby refracting light rays passing through the liquid crystal layer 124. A principle behind a change in refractive index of the liquid crystal layer 124 will be described below with reference to FIG. 4.

FIG. 4 is an example of the liquid crystal molecules that are initially in homogeneous alignment, in which the liquid crystal molecules are longitudinally parallel to a substrate surface. In FIG. 4, reference symbols 123a and 123b represent adjacent two wiring patterns of the plurality of wiring patterns that form the lower electrode 123. Reference symbol 125a denotes a wiring pattern of the upper electrode 125, located above the wiring patterns 123a and 123b.

When a voltage is delivered to the lower electrode 123 and the upper electrode 125 to generate an electric field in the liquid crystal layer 124, as shown in FIG. 4, the liquid crystal molecules longitudinally tilt at an angle $\psi$ in accordance with an orientation of the electric field, thereby changing the refractive index of the liquid crystal layer 124. When the refractive index is thus changed, light rays L1 emitted in the direction of the normal from the surface light source 110 (not shown) are deflected by an angle $\theta$ through the liquid crystal layer 124. As a result, light rays L2, which are the light lays L1 having undergone the deflection, is observed on the surface of the transparent substrate 129 (the upper electrode 125). The angle $\theta$, through which the light rays L1 are deflected, is hereinafter referred to as a deflection angle $\theta$.

As is apparent from the principle of the change in refractive index, the deflection angle $\theta$ changes according to the values of voltages applied to the wiring patterns of the lower electrode 123 and the upper electrode 125. In the directional backlight 100 according to the first embodiment, a control device 130, which will be described later, controls the values of voltages to be applied to the wiring patterns of the lower electrode 123 and the upper electrode 125 individually, thereby controlling the deflection angle $\theta$. The method of controlling the deflection angle $\theta$ will be described with reference to FIGS. 4 and 5.

In FIG. 4, the values of voltages applied to the wiring patterns 123a, 123b, and 125a are denoted to as V1, V2, and V0, respectively. In the first embodiment, relationships between magnitude relations among absolute values of the voltage values V1, V2, and V0 and a direction of deflection (direction of angle $\theta$) of light rays on application of the voltage values are assumed to have been obtained in advance as listed in a table shown in FIG. 5. Symbol "+" denotes a rightward direction on the surface of the liquid crystal layer 124 shown in FIG. 4, "0" denotes the direction of the normal of the liquid crystal layer 124, and "−" denotes a leftward direction on the surface of the liquid crystal layer 124.

A voltage controller 133, which will be described later, switches a magnitude relation among voltages to be applied to the wiring patterns 123a and 123b of the lower electrode 123, and the wiring pattern 125a of the upper electrode 125 among three relations: |V1|>|V2|=|V0|, |V0|=|V1|=|V2|, and |V0|=|V1|<|V2|, referring to the table shown in FIG. 5, thereby controlling the deflection angle $\theta$ of light passing through the liquid crystal layer 124 in horizontal three directions (lateral direction in FIG. 4).

The method of controlling the deflection angle $\theta$ in the horizontal directions has been described. However, the control method is not limited thereto, and the deflection angle $\theta$ can be controlled in a plurality of directions. For instance, by controlling a value of voltage to be applied to a wiring pattern (not shown) adjacent to the wiring pattern 125a simultaneously, light rays can be deflected to a direction of depth (hereinafter, "vertical direction") of a sheet plane of the drawing. Meanwhile, only some of the wiring patterns (the wiring patterns 123a, 123b, and 125a) that form the lower electrode 123 and the upper electrode 125 have been described, however, the voltage controller 133 controls values of voltages applied to the other wiring patterns as well.

The voltage values to be applied to the wiring patterns of the lower electrode 123 and the upper electrode 125 and magnitude relations thereamong, an example of which is shown in FIG. 5, depend on characteristics of the directional backlight 100, such as properties of the liquid crystal layer 124 and the size of the openings A of the light-shielding layer 128. Relationships between the characteristics of the directional backlight 100 and the deflection angle θ will be described below with reference to FIGS. 6A and 6B.

Figure 6A:
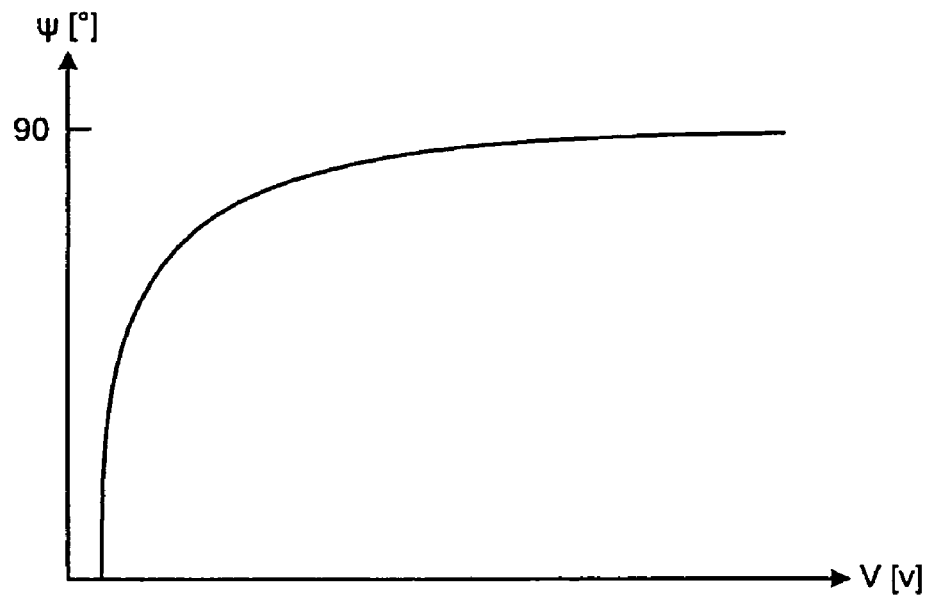
FIG. 6A is a diagram illustrating relationships between applied voltage values and orientation angles of liquid crystal molecules.

FIG. 6A is a diagram illustrating relationships between an orientation angle ψ of the liquid crystal molecules shown in FIG. 4 and a voltage value V applied to the lower electrode 123 and the upper electrode 125. FIG. 6A shows an example in which the orientation angle ψ relative to the horizontal is 0 degree. As shown in FIG. 6A, the orientation angle ψ of the liquid crystal molecules in homogeneous alignment sharply increases to approach a maximum angle thereof, that is, 90 degrees, as the voltage value increases. The deflection angle θ is attained by accumulating the orientation angle ψ of the liquid crystal molecules in the liquid crystal layer 124. Hence, by individually controlling the voltage values to be applied to the wiring patterns on a wiring-pattern by wiring-pattern basis and thereby changing the orientation angle ψ, the deflection angle θ can be set to a desired value. The voltage controller 133, which will be described later, controls the voltage values in a unit of wiring patterns corresponding to each one of the openings A, thereby directing light rays emitted from the surface light source 110 and passing through the opening A toward a predetermined position (e.g., the position of the observer O).

When the liquid crystal layer 124 with, for example, viscosity coefficient $K=15.8\times10^{-12}$ newtons, permittivity in a direction parallel to an initial orientation $\epsilon p=8.3\cdot\epsilon_0$, permittivity in a direction perpendicular to the initial orientation $\epsilon v=3.1\cdot\epsilon_0$, and thickness of the liquid crystal layer 124 (liquid crystal cell gap) "d"=5 micrometers is used, the orientation angle ψ attains 90 degrees with application of approximately 8 volts or higher. Here, $\epsilon_0$ is permittivity in vacuum ($8.854\times10^{-12}$ F/m).

Figure 6B:
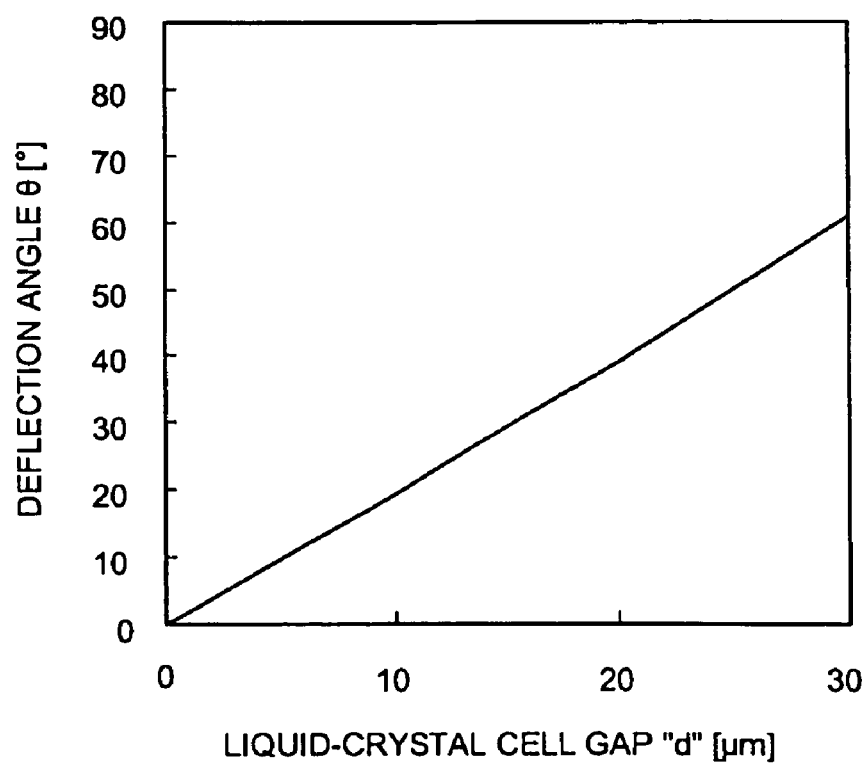
FIG. 6B is a diagram illustrating relationships between liquid-crystal cell gaps and light deflection angles according to the first embodiment.

FIG. 6B is a diagram illustrating relationships between the deflection angle θ and the liquid crystal cell gap "d" in a condition, in which |V1−V2| is a maximum value, refractive index difference Δn is 0.2, and the size of the openings A is 10 micrometers. Under this condition, the deflection angle θ attains 60 degrees or higher when the liquid crystal cell gap "d" is 30 micrometers or greater.

By determining the voltage values to be applied to the wiring patterns of the lower electrode 123 and the upper electrode 125 based on the characteristics of the liquid crystal layer 124 shown in FIGS. 6A and 6B, the size of the openings A of the light-shielding layer 128, and other properties, the deflection angle can be controlled to a desired direction. In the first embodiment, it is assumed that N sets of voltage values (or magnitude relations among voltage values) to be used to control light rays so that the light rays are deflected at different angles in at least one of the horizontal and vertical directions have been derived in advance (N is an integer greater than or equal to 2). It is also assumed that the N voltage value sets to be applied to the wiring patterns of the lower electrode 123 and the upper electrode 125 have been defined in setting information 1321 that is stored in advance in a storage unit 132, which will be described later.

Figure 7:
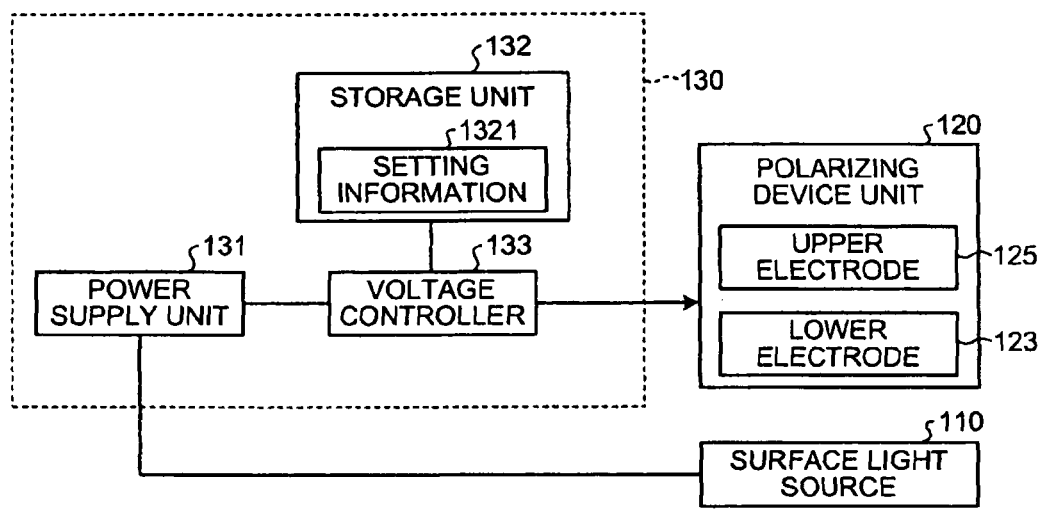
FIG. 7 is a block diagram illustrating a control device of the directional backlight.

FIG. 7 is a schematic block diagram illustrating the control device 130 used to drive the directional backlight 100. As shown in FIG. 7, the control device 130 includes a power supply unit 131, the storage unit 132, and the voltage controller 133.

The power supply unit 131 feeds electric power supplied from an external commercial power supply or the like to electric loads of the directional backlight 100. Components other than power supply lines related to the polarizing device unit 120 are not shown in FIG. 7.

The storage unit 132 is a storage device such as a read only memory (ROM), and stores various data sets pertaining to drive control of the directional backlight 100 in advance. Specifically, the storage unit 132 stores the setting information 1321 that defines the voltage values to be applied to the wiring patterns of the lower electrode 123 and the upper electrode 125 in advance.

The N sets of the voltage values (or magnitude relations among the voltage values) to be individually applied to the wiring patterns of the lower electrode 123 and the upper electrode 125 are defined in the setting information 1321 in advance. The N voltage value sets are determined such that, under application of voltages of any one of the N voltage value sets, the light rays L2 passing through the openings A are directed toward a specific position (light convergence position). Hereinafter, the state in which one of the voltage value sets is applied to the wiring patterns is referred to as a "voltage application state." Positions at each of which the light rays converge in a corresponding one of the N voltage application states, that is, N light convergence positions, are set to differ from one another. The light convergence positions can be set to any desired positions. For example, the positions can be possible positions of assumed observers. The setting information 1321 can be stored in the form of, for example, a table as shown in FIG. 5 or a relational expression, from which the N voltage value sets to be individually applied to the wiring patterns can be uniquely derived.

Meanwhile, the power supply unit 131 supplies electric power to the electric loads of the directional backlight 100. The voltage controller 133 controls a portion of the power, i.e., the voltage values to be applied to the wiring patterns of the lower electrode 123 and the upper electrode 125 of the polarizing device unit 120, based on the setting information 1321 stored in the storage unit 132. Specifically, the voltage controller 133 applies voltages individually to the wiring patterns that form the lower electrode 123 and the upper electrode 125 while switching voltage values from one voltage value set to another among the N voltage value sets defined in the setting information 1321 at predetermined time intervals. The time intervals for switching the voltage values are not specifically limited, however, preferably set to such time intervals that will not cause the observer to experience flicker.

The voltage controller 133 applies voltages to the wiring patterns while switching the voltage application state among the N voltage value application states at the predetermined time intervals. This time-division control causes the light rays emitted from the surface light source 110 and passing through the openings A to direct toward the N light convergence positions. Accordingly, the directions of the light rays emitted from the directional backlight 100 can be switched at the predetermined time intervals, which allow to provide a sufficiently-broad viewing range at each of the light convergence positions.

As described above, according to the first embodiment, because the directions of the light rays emitted from the single surface light source can be switched, the number of directions of the light rays is increased. In addition, because the luminance distribution of the light rays emitted from the surface light source are concentrated close to the normal of the light emitting surface, a viewing range can be secured at each of the positions toward which the light rays direct, thereby increasing a total area of the viewing ranges.

Next, as a second embodiment, an image display apparatus including the directional backlight 100 will be described. In the following descriptions, elements identical to those of the first embodiment are denoted by like reference numerals or symbols, and redundant descriptions thereof will be omitted.

Figure 8:
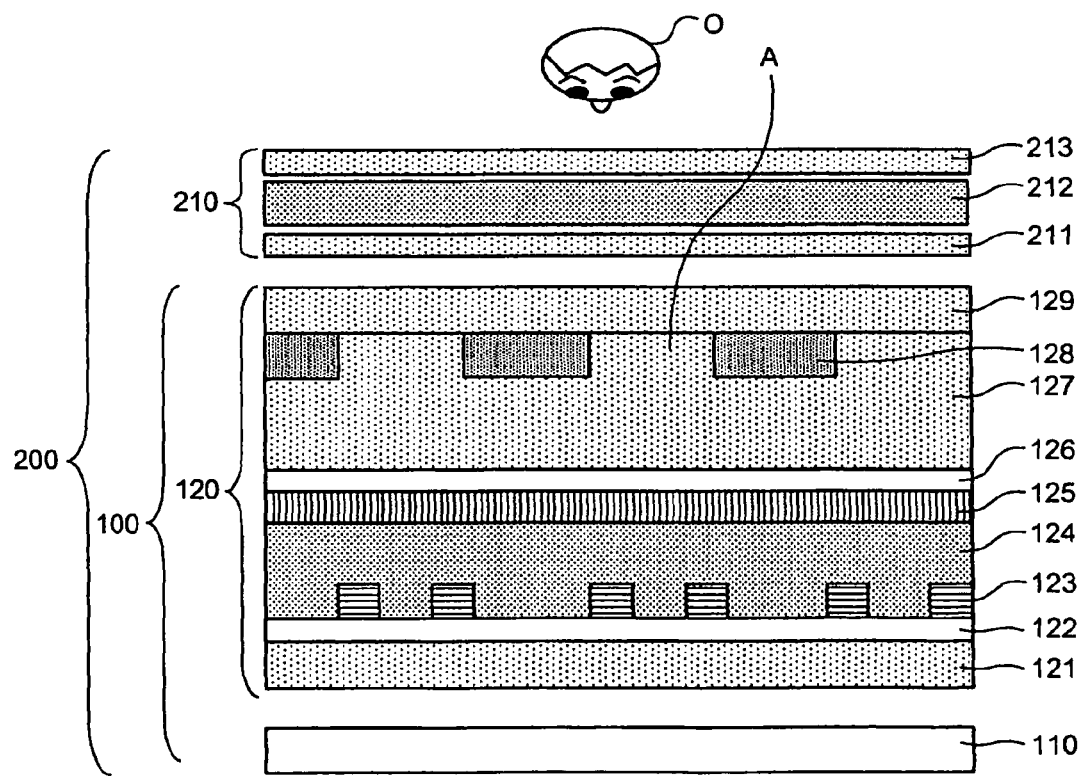
FIG. 8 is a schematic diagram illustrating a structure of an image display apparatus according to a second embodiment of the present invention.

FIG. 8 is a horizontal cross-sectional diagram schematically depicting an image display apparatus 200 according to the second embodiment. In FIG. 8, the observer is positioned on a top side, that is, the directional backlight 100 emits light to the top side. The image display apparatus 200 can be any one of a flat type and a tilt type. The flat type is installed with an image-display surface (light-emitting surface) parallel with the horizontal in a real space. The tilt type is installed in a tilted orientation relative to the horizontal so that the image display surface faces the observer O.

As shown in FIG. 8, the image display apparatus 200 includes the surface light source 110, the polarizing device unit 120 provided above the surface light source 110, and a liquid crystal display (LCD) panel 210 provided above the polarizing device unit 120.

The LCD panel 210 includes a light-transmissive polarizing plate 211, a liquid crystal cell 212 on the polarizing plate 211, and a light-transmissive polarizing plate 213 in the order given. The liquid crystal cell 212 is formed from, e.g., a nematic liquid crystal.

The polarizing plate 211 allows, among light rays incoming from the directional backlight 100, only light rays that vibrate in a predetermined direction to pass through the polarizing plate 211. The polarizing plate 211 can be a linearly-polarizing plate, a circularly polarizing plate, an elliptically-polarizing plate, or the like.

The liquid crystal cell 212 is an LCD device that includes a pair of substrates (not shown) each having a transparent electrode, and a liquid crystal layer (not shown) retained between the substrates. Voltages applied across the transparent electrodes under control of a synchronization controller 223, which will be described later, form an image on the image display surface of the LCD device. Pixels are arranged in a matrix of substantially horizontal columns and vertical rows on the image display surface of the liquid crystal cell 212. Red (R), green (G), and blue (B) sub-pixels are arranged in an array on the image display surface. The R, G, and B sub-pixels are provided by placing color filters on the image display surface.

A predetermined relationship is maintained between the pixels arranged on the image display surface of the liquid crystal cell 212 and the opening A of the light-shielding layer 128. Specifically, the opening A is substantially identical in size with each of the sub-pixels that form the pixels of an image display unit as viewed from the front of the image display unit. The size of the opening A is preferably slightly smaller than that of the individual sub-pixels.

The width of each wiring pattern and the gap size between adjacent two of the wiring patterns of the lower electrode 123 and the upper electrode 125 are preferably determined according to the size of opening A, that is, the size of the individual sub-pixels that form the image display surface of the liquid crystal cell 212. The width of each wiring pattern and the gap size between adjacent two of the wiring patterns are preferably smaller than the size of the individual sub-pixels as well.

The polarizing plate 213 allows, among light rays incoming through the polarizing plate 211 and the liquid crystal cell 212, only light rays that vibrate in a predetermined direction to pass through. The polarizing plate 213 can be a linearly-polarizing plate, a circularly polarizing plate, an elliptically-polarizing plate, or the like, as with the polarizing plate 211.

Figure 9:
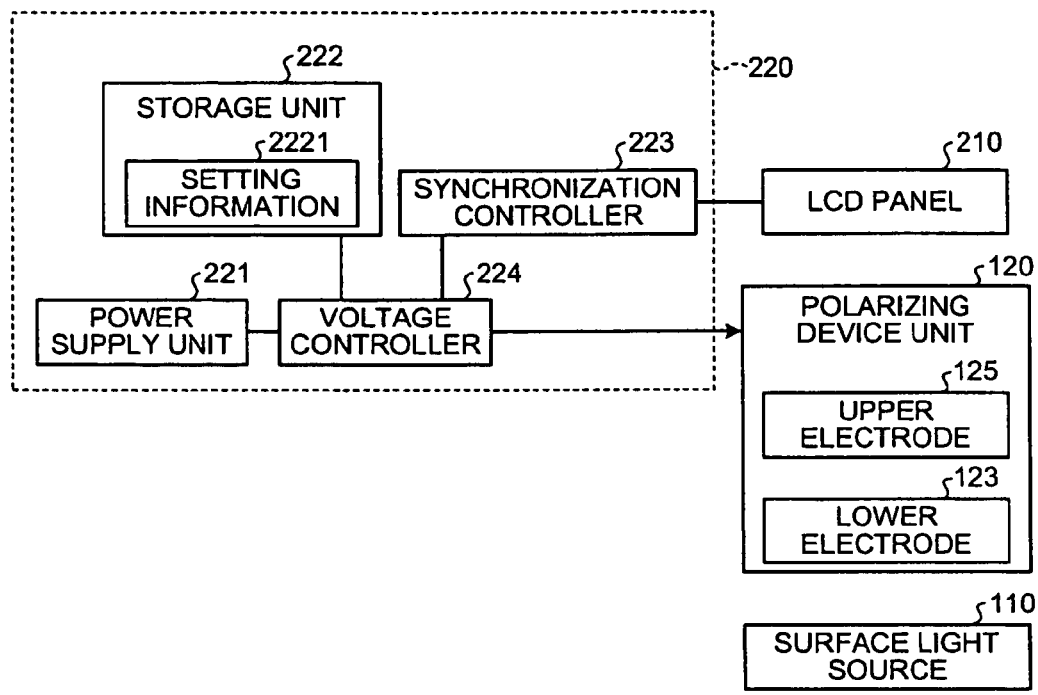
FIG. 9 is a block diagram illustrating a control device the image display apparatus.

FIG. 9 is a schematic block diagram illustrating a control device 220 used to drive the image display apparatus 200. As shown in FIG. 9, the control device 220 includes a power supply unit 221, a storage unit 222, the synchronization controller 223, and a voltage controller 224.

The power supply unit 221 feeds electric power supplied from an external commercial power supply or the like to electric loads in the image display apparatus 200. Components other than power supply lines related to the polarizing device unit 120 are not shown in FIG. 9.

The storage unit 222 is a storage device similar to the storage unit 132, and stores various data sets pertaining to drive control of the image display apparatus 200 in advance. Specifically, as in the case of the first embodiment, the storage unit 222 stores setting information 2221 that defines the N sets of values of voltage to be applied to the wiring patterns of the lower electrode 123 and the upper electrode 125 in advance.

As with the setting information 1321, the N sets of the voltage values (or magnitude relations among the voltage values) to be individually applied to the wiring patterns that form the lower electrode 123 and the upper electrode 125 have been defined in the setting information 2221 in advance. These voltage values are determined based on physical characteristics of the liquid crystal layer 124 and the size of the individual openings A of the light-shielding layer 128. The N voltage value sets are determined such that the light rays L2 passing through the openings A and then through the LCD panel 210 are directed toward a specific light convergence position in any one of the N voltage value states. Positions at each of which the light rays converge in a corresponding one of the N voltage application states, that is, the N light convergence positions, are set to differ from one another. The light convergence positions can be set to any desired positions. For example, the positions can be possible positions of assumed observers.

The synchronization controller 223 divides a frame of image stored in the storage unit 222 or the like into M field images (M is an integer greater than or equal to 2), and displays each of the field images on the image display surface of the liquid crystal cell 212 while switching the displayed field image to another field image at predetermined time intervals. The number M, by which each frame is divided, is preferably N, which is the number of voltage value sets defined in the setting information 2221, alternatively, an integral multiple relation can stand between N and M. The time intervals for switching the field image are not specifically limited, however, preferably set to such time intervals that will not cause the observer to experience flicker.

Meanwhile, the power supply unit 221 supplies electric power to the electric loads of the directional backlight 100. The voltage controller 224 controls a portion of the power, i.e., the voltage values to be applied to the lower electrode 123 and the upper electrode 125 of the polarizing device unit 120, based on the setting information 2221 stored in the storage unit 222. Specifically, the voltage controller 224 applies voltages individually to the wiring patterns that form the lower electrode 123 and the upper electrode 125 while switching voltage values from one voltage value set to another among the N voltage value sets defined in the setting information 2221 at predetermined time intervals. In the second embodiment, the switching of the voltage value set to be applied to the wiring patterns is performed in synchronization with the switching of the field image performed by the synchronization controller 223.

As described above, the voltage controller 224 applies voltages to the wiring patterns while switching the voltage application state among the N voltage application states at the predetermined time intervals. This time-division control causes the light rays emitted from the surface light source 110 and passing through the openings A and then through the LCD panel 210 to direct toward the N light convergence positions. Accordingly, the directions of the light rays emitted from the directional backlight 100 are switched at the predetermined time intervals, which allow to provide a sufficiently-broad viewing range at each of the light convergence positions.

Figure 10:
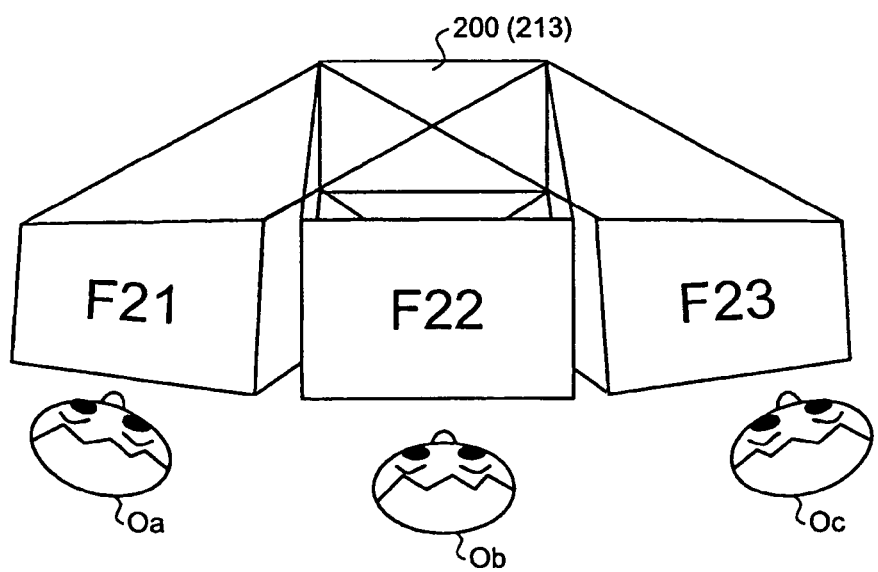
FIG. 10 is a top view of the image display apparatus.

FIG. 10 is a plan view of the image display apparatus 200 as viewed from the side of observers. In FIG. 10, reference symbols F21, F22, and F23 denote viewing ranges at positions of observers Oa, Ob, and Oc, respectively. Each viewing range is formed with light rays emitted from the surface light source 110 and passed through the polarizing device unit 120 and the LCD panel 210.

FIG. 10 depicts a state in which the voltage controller 224 performs time-division control of the voltage values to be individually applied to the wiring patterns according to three field images that form a frame of image. This control causes the light rays emitted from the surface light source 110 to be directed toward each of the positions of the observers Oa, Ob, and Oc. Thus, by controlling the directions of light rays outgoing from the image display surface in the horizontal direction (lateral direction in FIG. 10), the viewing ranges F21, F22, and F23 are secured at the positions of the observers Oa, Ob, and Oc, respectively. This control allows to display multiple two-dimensional views (three views in the example shown in FIG. 10).

Figure 11:
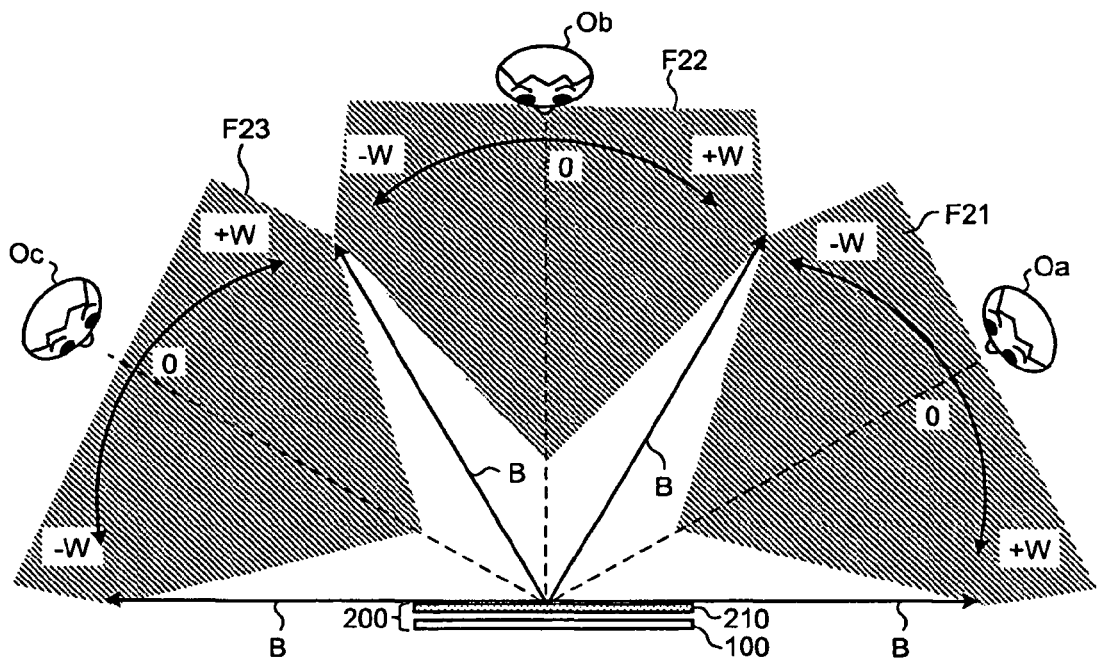
FIGS. 11 to 14 are schematic diagrams of relationships between the image display apparatus and observers.

FIG. 11 depicts relationships between the image display apparatus 200 shown in FIG. 10 and the observers Oa, Ob, and Oc. As shown in FIG. 11, the voltage controller 224 controls the voltage values to thereby switch the directions of the light rays emitted from the image display apparatus 200 with reference to the positions "0" of the observers Oa, Ob, and Oc. As a result, the viewing ranges F21, F22, and F23 centered at the positions of the observers Oa, Ob, and Oc, respectively, are provided. Reference symbol B in FIG. 11 denotes boundaries between adjacent twos of the viewing ranges F21, F21, and F23. Reference symbols "−W" and "+W" in FIG. 11 denote positions of the boundary B on the negative side (−) and that on the positive side (+), respectively, with reference to the observer's position "0" in each of the viewing ranges F21 to F23.

Figure 12:
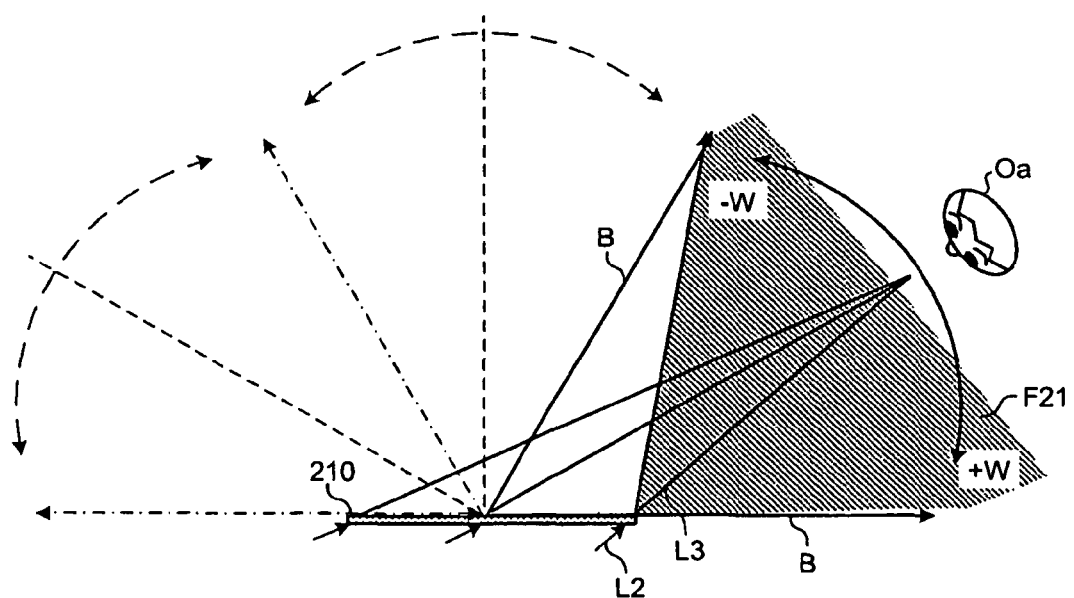
Figure 13:
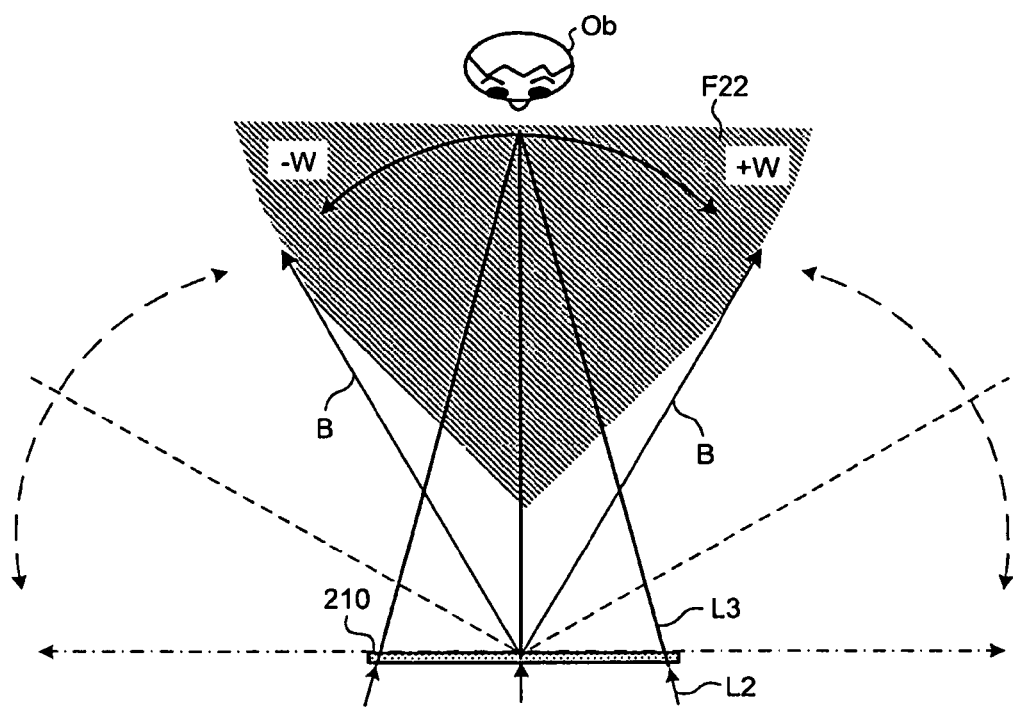
Figure 14:
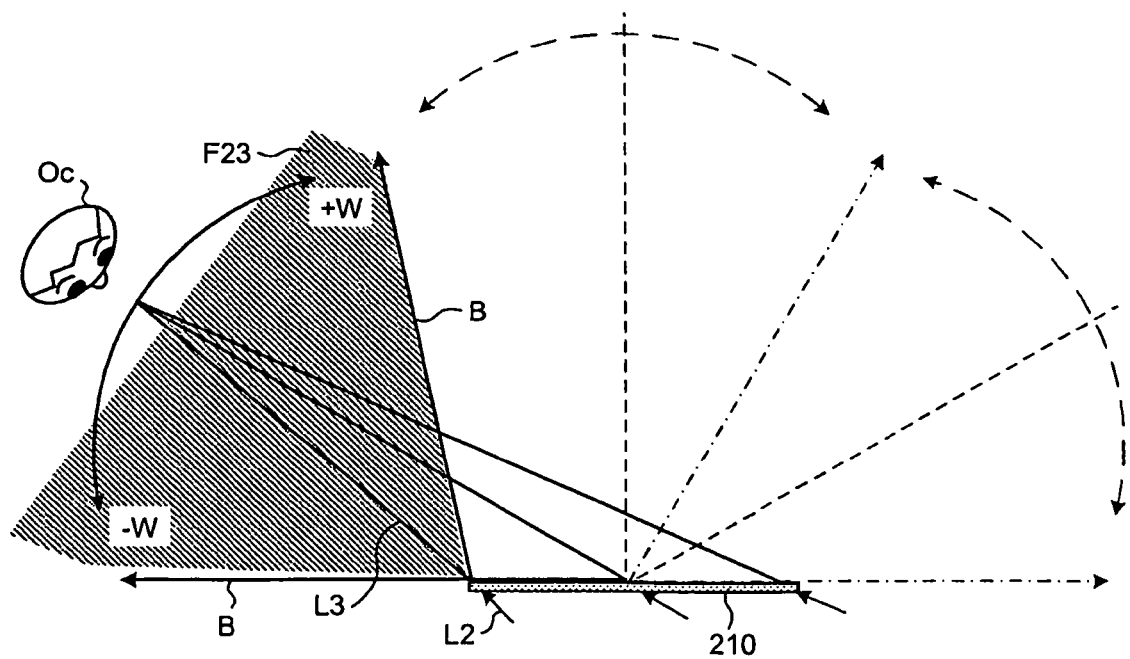

FIGS. 12 to 14 depict relationships between the viewing ranges F21, F22, and F23 at the observers' positions Oa, Ob, and Oc shown in FIG. 11, and the light rays L2 emitted from the directional backlight 100, respectively. The directional backlight 100 is not shown in FIGS. 12 to 14.

As shown in FIGS. 12 to 14, the voltage controller 224 controls incident angles of the light rays L2 impinging on the LCD panel 210 at a plurality of positions so that light rays L3 are emitted toward the positions corresponding to the positions of the observers O (more specifically, Oa, Ob, and Oc). Switching the directions of the light rays L3 according to the positions of the observer O allows to secure a broad area for each of the viewing ranges F21 to F23 at the observers' positions.

As is clear from FIGS. 12 to 14, directions of the light rays emitted from side end portions of the image display unit and those emitted from a center portion differ from each other in each of the drawings. For instance, when an image is viewed from the position of the observer Oc in FIG. 14, light rays emitted from a right end of the image display surface have a greater angle relative to the normal of the image display surface than light rays emitted from a left end. That is, with reference to the position of the observer Oc, the directions of light rays emitted toward the position of the observer Oc differ from one another depending on a position, from which the light rays are emitted, on the image display surface. Accordingly, the voltage controller 224 controls the voltage values to be individually applied to the wiring patterns of the lower electrode 123 and the upper electrode 125 using the directional backlight 100, thereby directing light toward the observers' positions.

In addition, the directions (deflection angle θ) of the light rays L2 passing through the light-shielding layer 128 of the directional backlight 100 can be controlled for each of the sub-pixels of the LCD panel 210 (liquid crystal cell 212). This control allows an image displayed on the image display surface of the liquid crystal cell 212 with the light rays L3 to be reproduced at a higher definition, thereby increasing the images displayed on the viewing ranges F21 to F23 in image quality.

Figure 15:
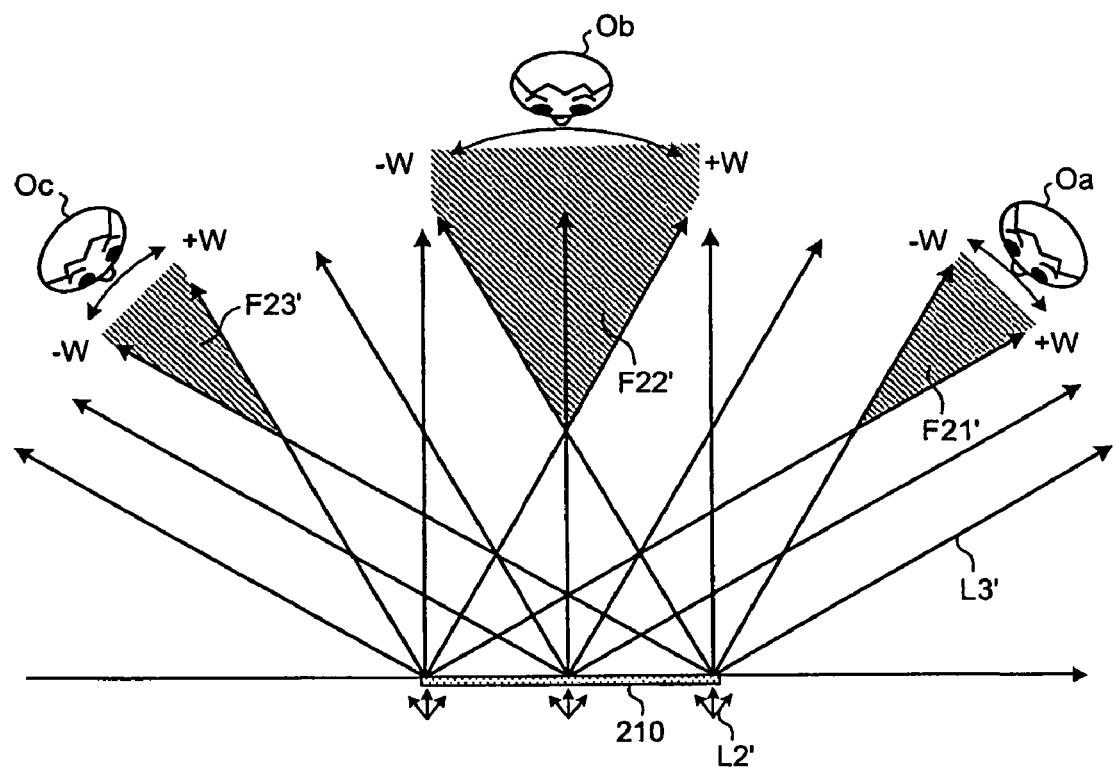
FIG. 15 is a schematic diagram illustrating relationships between a conventional image display apparatus and observers.

FIG. 15 depicts a configuration corresponding to a conventional image display apparatus adopted for comparison with the configuration shown in FIG. 11. FIG. 15 depicts loci of light rays L2' that impinge on the LCD panel 210 without being angularly directed, that is, that are collimated and all emitted in one direction (in the direction of the normal of the image display surface of the LCD panel 210), at the observers' positions Oa, Ob, and Oc. The configuration shown in FIG. 15 can be constructed by, for example, equating the voltage values applied to the wiring patterns of the lower electrode 123 and the upper electrode 125 of the polarizing device unit 120.

In the configuration shown in FIG. 15, light rays L3' (image light), which are the light rays L2' that have transmitted through the LCD panel 210, create viewing ranges F21', F22', and F23' at the observers' positions Oa, Ob, and Oc, respectively. Reference symbols "−W" and "+W" in FIG. 15 denote positions of a boundary on the negative side (−) and that on the positive side (+), respectively, with reference to the observer's position "0" of each of the viewing ranges F21' to F23'.

Because the viewing ranges F21' to F23' are created based on the light rays L2' that are collimated and emitted in one direction, the total quantity of light obtained at the observers' positions is smaller than that obtained in the configuration shown in FIG. 11. Hence, a total area of the viewing ranges is smaller than that of the configuration shown in FIG. 11. In particular, the viewing ranges at the observers' positions Oa and Oc are significantly are reduced in area. Meanwhile, as shown in FIG. 11, the image display apparatus 200 according to the second embodiment can create the viewing ranges F21 to F23 which are substantially identical to one another in size, thereby allowing to secure the viewing ranges that are greater in total area than those provided by the configuration shown in FIG. 15.

Figure 16A:
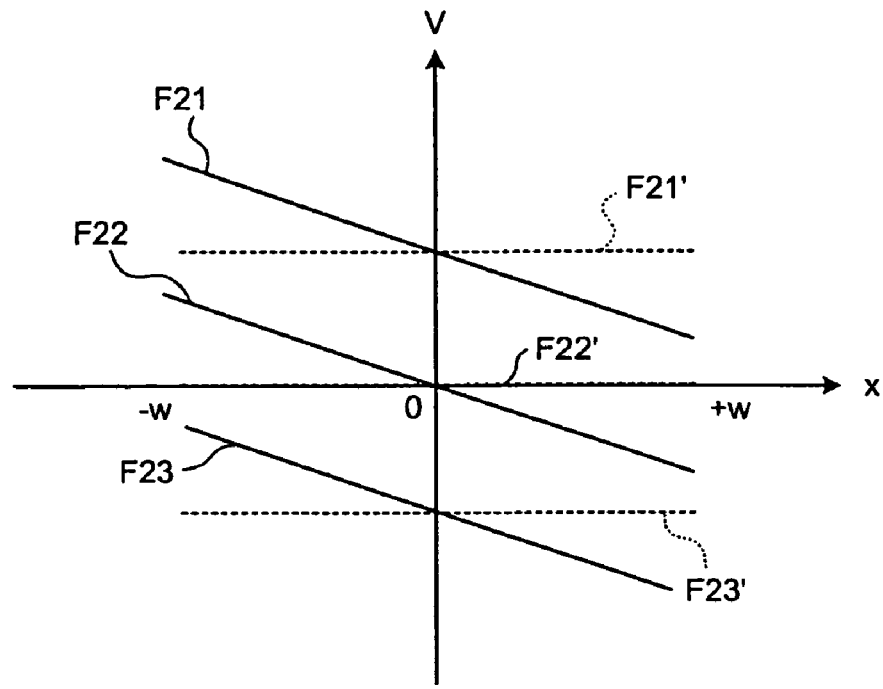
FIG. 16A is a diagram illustrating relationships between viewing ranges and applied voltage values.
Figure 16B:
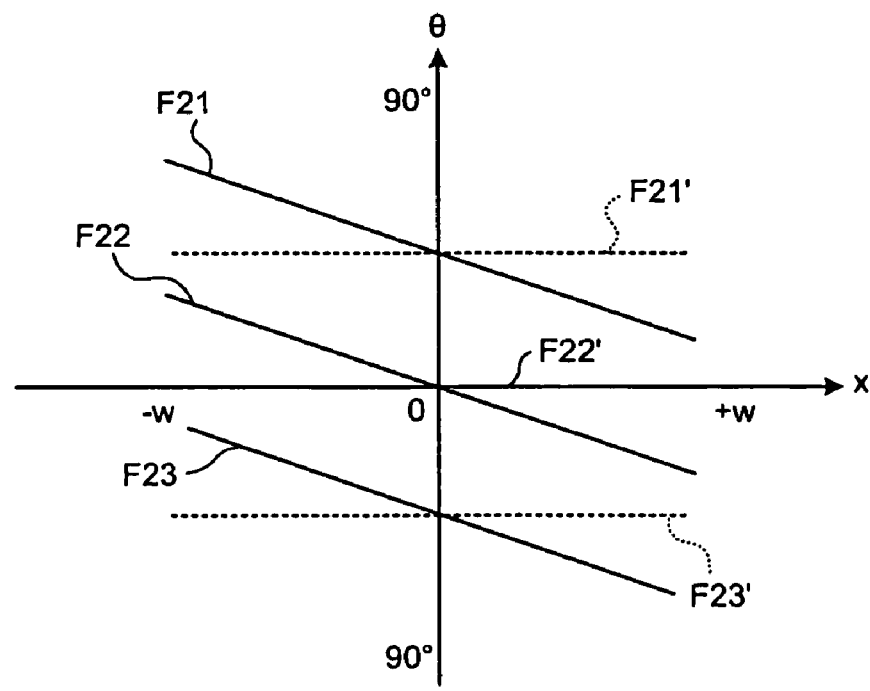
FIG. 16B is a diagram illustrating relationships between the viewing ranges and deflection angles.

FIG. 16A is a diagram illustrating comparison between the voltages V applied to the polarizing device unit 120 (the lower electrode 123 and the upper electrode 125) to create each of the viewing ranges F21 to F23 shown in FIG. 11 and F21' to F23' shown in FIG. 15. FIG. 16B is a diagram illustrating comparison between angles at which the light rays L3 are emitted to create the viewing ranges F21 to F23 shown in FIG. 11 and F21' to F23' shown in FIG. 15, that is, for comparison between the deflection angles θ of the light rays L2. In FIGS.

16A and 16B, the positions between −W and +W of the viewing ranges are expressed along the horizontal axis X with the centers of the viewing ranges at 0. The vertical axis of FIG. 16B expresses the deflection angle θ such that when light rays are straightforwardly emitted from the polarizing device unit 120 at an illuminating angle of 0 degree, that is, when light rays are emitted in the direction of the normal of the display surface on the LCD panel 210, θ=0° is given.

As shown in FIG. 16A, the voltages V applied to create the viewing ranges F21 to F23 are varied from the position −W to the position +W in each viewing range. As shown in FIG. 16B, the deflection angle θ of the light rays L2 emitted to create the viewing ranges F21 to F23 is varied from the position −W to the position +W in each viewing range in response to the change in voltage. In contrast, because the voltages V applied to create the viewing ranges F21' to F23' are constant at any point, the deflection angle θ of the light rays L2 is also constant.

As described above, according to the second embodiment, because the directions of the light rays emitted from the single surface light source can be switched, the number of directions of the light rays is increased. In addition, because the luminance distribution of light rays emitted from the surface light source are concentrated close to the normal of the light emitting surface, a sufficiently-broad viewing range can be secured at each of the positions toward which the light rays direct, thereby increasing a total area of the viewing ranges. In addition, the second embodiment allows to project field images individually on each of the viewing ranges created by controlling the directions of the rays emitted from the single surface light source, thereby attaining multi-view display.

The second embodiment has described the mode in which the directions of the light rays are controlled so as to be distributed in the horizontal three directions, however, the control mode is not limited thereto.

Figure 17A:
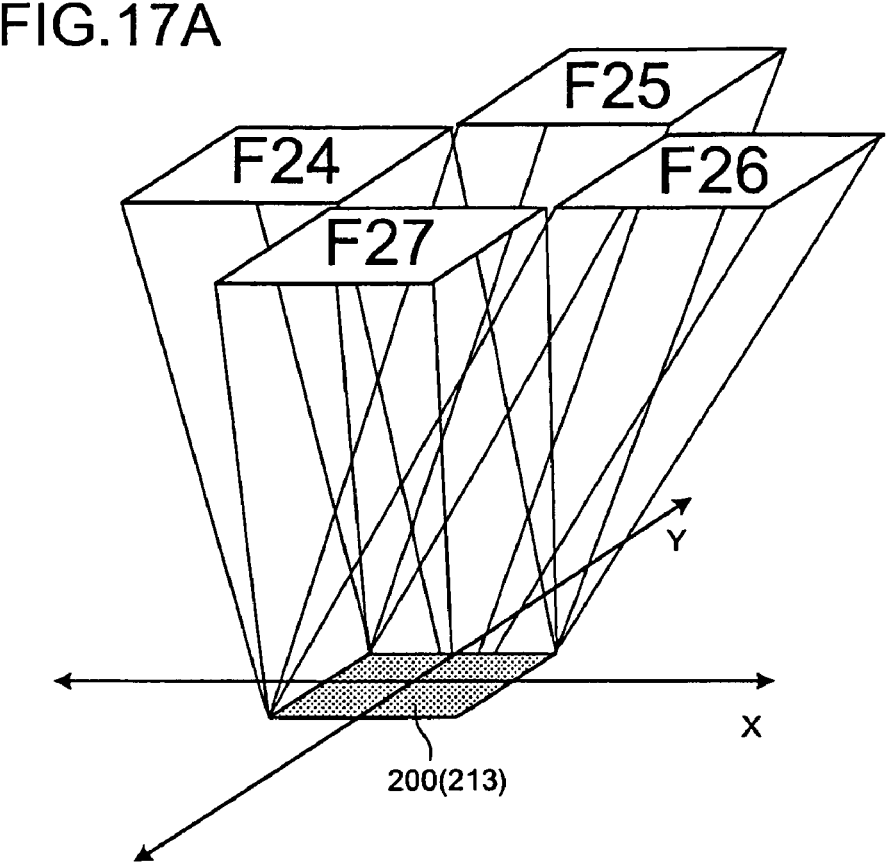
FIG. 17A is a diagram illustrating viewing ranges provided when light rays are controlled to horizontal and vertical four directions.
Figure 17B:
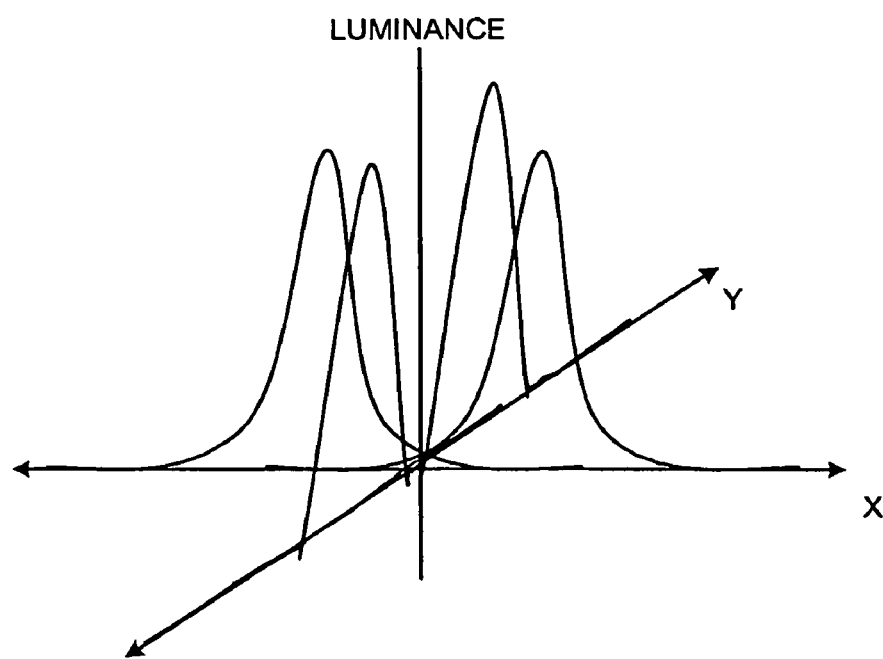
FIG. 17B is a diagram illustrating luminance distribution in a mode, in which directions of light rays are controlled to the horizontal and vertical four directions.

For instance, another mode of controlling directions of the light rays so as to be distributed also in the vertical direction, as shown in FIG. 17A, can be employed. FIG. 17A is a schematic diagram illustrating a mode in which the directional backlight 100 is placed on the bottom surface of the LCD panel 210 in a flat orientation, and directions of light rays outgoing from the image display surface are controlled in the horizontal direction (X direction) and the vertical direction (Y direction). In this control mode, as in the control mode shown in FIG. 10 in which the light ray directions are horizontally controlled, the light ray directions emitted from the image display surface, that is, the directions of light rays emitted from the surface light source 110, are vertically controlled to direct toward within the viewing ranges of the observers so that viewing ranges F24 to F27 in total four directions, vertical two directions and horizontal two directions, are secured. As shown in FIG. 17B, luminance distribution of light rays in the viewing ranges F24 to F27 are distributed such that the luminance distribution have their peaks at a center of each viewing range and decreases toward outer edges due to the luminous distribution characteristics of the surface light source 110. This allows to provide a sufficiently-broad viewing range at any one of the positions.

The second embodiment has been described on an assumption that the observers' positions Oa, Ob, and Oc shown in FIG. 11 and others are presumed in advance. However, the observers' positions are not limited to presumed ones, and another mode with an assumption that the observers' positions are determined by actual measurement can be employed. For instance, as another mode, a position detector that detects a position of an observer can be additionally provided in an alternative mode. In this mode, values of voltages to be applied to the wiring patterns of the lower electrode 123 and the upper electrode 125 are determined based on a light converging position, which is an observer's position detected by the position detector. The voltage controller 224 derives voltage values corresponding to the position detected by the position detector from the setting information 2221, and individually applies the voltage values to the wiring patterns of the lower electrode 123 and the upper electrode 125 so that light rays are concentrated to the light convergence position, that is, the observer's position. Another mode of, when the position detector detects two or more observers, switching a voltage application state among voltage application states of the number corresponding to the number of the positions, that is, the number of the observers, at predetermined time intervals can be adopted.

The image display apparatus 200 can also be used as an M-view stereoscopic display apparatus by causing the M field images to be displayed on the LCD panel 210 as multiple-viewpoint images and adjusting a degree of angle by which the deflection angle θ is changed, i.e., a distance between light convergence positions, to a distance between eyes. For instance, by causing the synchronization controller 223 to display one of two field images, one for a left eye and the other for a right eye, on the LCD panel 210 while the synchronization controller 223 performs switching between the two field images, the image display apparatus 200 can be devised as a binocular stereoscopic display apparatus.

Figure 18:
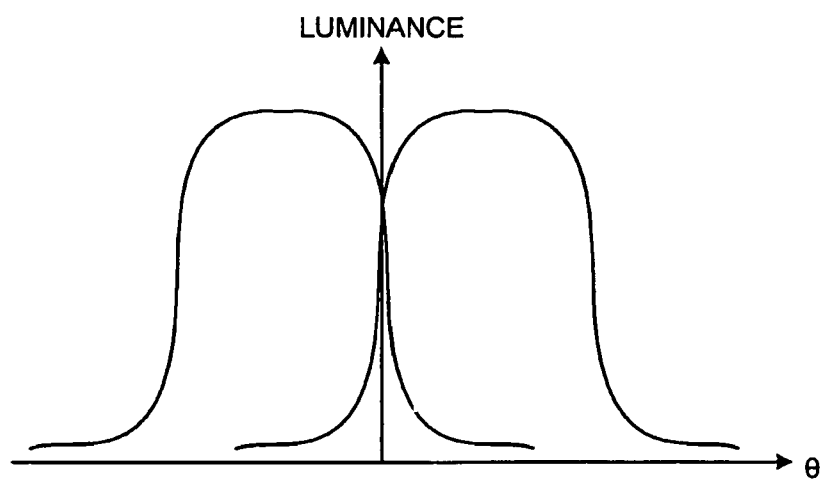
FIG. 18 is a diagram illustrating luminance distribution of light rays on an LCD panel according to the second embodiment.

FIG. 18 depicts luminance distribution of the light rays L3, of which directions are switched between two directions, measured at a center of the LCD panel 210. As shown in FIG. 18, when the control device 220 performs time-division control of directions of light rays, luminance distribution has a peak in each direction of the light rays. Meanwhile, an overlapping area of the luminance distributions is small due to light emitting characteristics of the surface light source 110.

As shown in FIG. 18, to construct the binocular stereoscopic display apparatus, the overlap area of luminance distributions needs to be small in each of light convergence positions. Accordingly, it is favorable to employ the image display apparatus 200 described in the second embodiment as the binocular stereoscopic display apparatus.

Next, as a third embodiment, a stereoscopic display apparatus that includes the directional backlight 100 and employs a multi-view display scheme or a one-dimensional IP system to provide images with parallax will be described. In the following descriptions, elements identical to those of the first and second embodiments are denoted by like reference numerals or symbols, and redundant descriptions thereof will be omitted.

Figure 19:
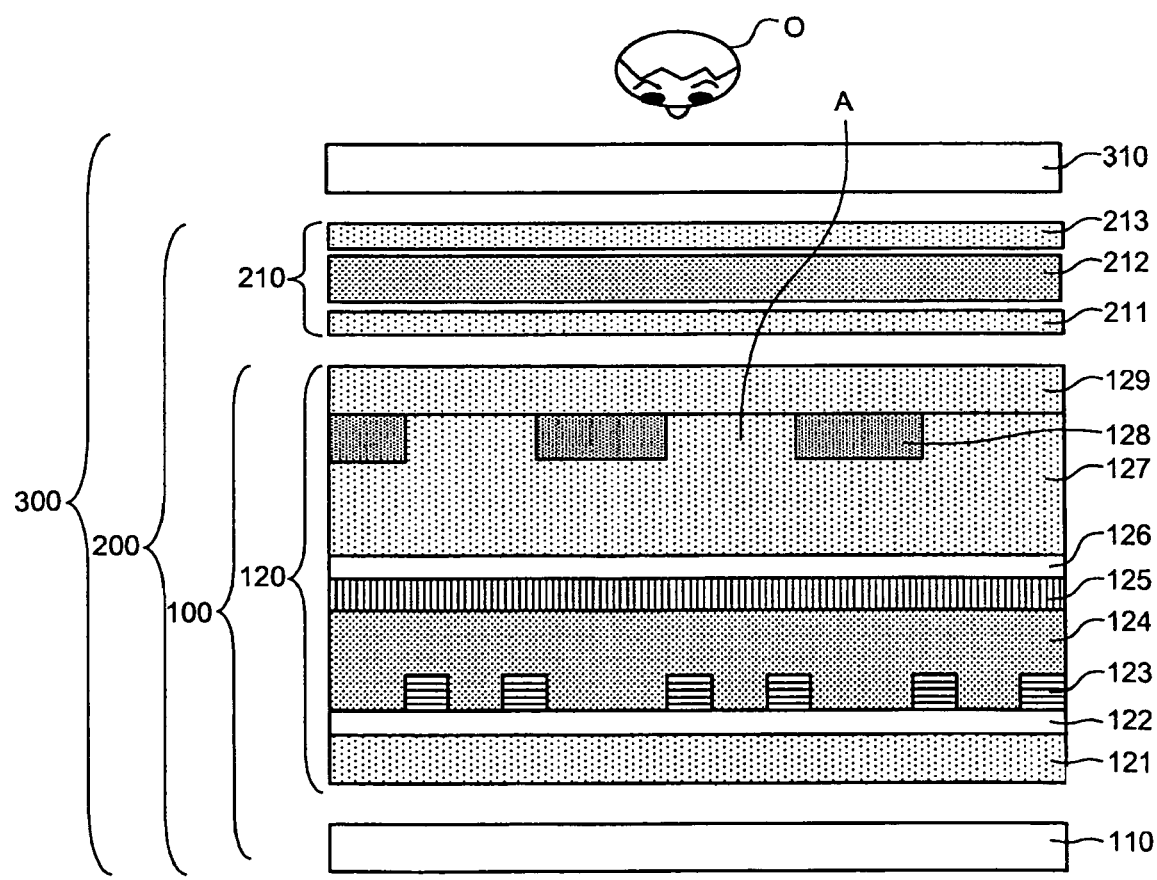
FIG. 19 is a schematic diagram illustrating a structure of a stereoscopic display apparatus according to a third embodiment of the present invention.

FIG. 19 is a horizontal cross-sectional diagram schematically depicting a stereoscopic display apparatus 300 according to the third embodiment. In FIG. 19, the observer is positioned on a top side, that is, the directional backlight 100 emits light to the top side. The stereoscopic display apparatus 300 can be any one of a flat type and a tilt type. The flat type is installed with an image-display surface (light-emitting surface) parallel with the horizontal in a real space. The tilt type is installed in a tilted orientation relative to the horizontal so that the image display surface faces the observer O.

As shown in FIG. 19, the stereoscopic display apparatus 300 includes the surface light source 110, the polarizing device unit 120 that faces the surface light source 110, and the LCD panel 210 that faces the polarizing device unit 120, and a parallax creating element 310 that faces the LCD panel 210.

The parallax creating element 310 is an optical element, such as a lenticular plate, a slit array, a fly eye's lens array, or a pinhole array, that causes the observer O to perceive a parallax between a view for a right eye and a view for a left eye.

Figure 20:
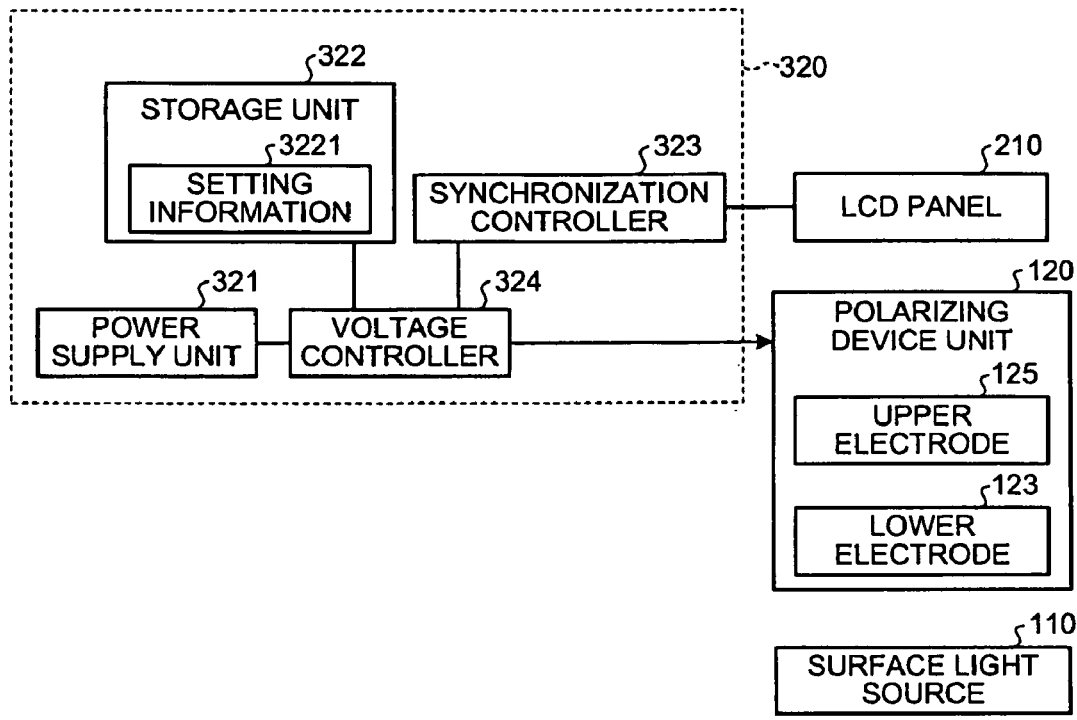
FIG. 20 is a block diagram illustrating a control device of the stereoscopic display apparatus.

FIG. 20 is a schematic block diagram illustrating a control device 320 used to drive the stereoscopic display apparatus 300. As shown in FIG. 20, the control device 320 includes a power supply unit 321, a storage unit 322, a synchronization controller 323, and a voltage controller 324.

The power supply unit 321 feeds electric power supplied from an external commercial power supply or the like to electric loads in the stereoscopic display apparatus 300. Components other than power supply lines related to the polarizing device unit 120 are not shown in FIG. 20.

The storage unit 322 is a storage device similar to the storage units 132, 222, and stores various data sets pertaining to drive control of the stereoscopic display apparatus 300 in advance. Specifically, as in the case of the first and second embodiments, the storage unit 322 stores setting information 3221 that defines the N voltage values sets to be applied to the wiring patterns of the lower electrode 123 and the upper electrode 125 in advance. The storage unit 322 stores an elemental image array, which will be described later, to be displayed on the LCD panel 210.

As with the setting information 1321, 2221, the N sets of the voltage values (or magnitude relations among the voltage values) to be individually applied to the wiring patterns that form the lower electrode 123 and the upper electrode 125 have been defined in the setting information 3221 in advance. These voltage values are determined based on the physical characteristics of the liquid crystal layer 124 and the size of the individual openings A of the light-shielding layer 128. The N voltage value sets are determined such that the light rays L4 passing through the openings A, and then through the LCD panel 210 and the parallax creating element 310 are directed toward a specific light convergence position in any one of the N voltage value states. Positions at each of which the light rays converge in a corresponding one of the N voltage application states, that is, N light convergence positions, are set to differ from one another. The light convergence position can be set to any desired position. For example, the positions can be possible positions of assumed observers.

The synchronization controller 323 divides the elemental image array stored in the storage unit 322 or the like into M field images (M is an integer greater than or equal to 2), and displays each of the field images on the image display surface of the liquid crystal cell 212 while switching the displayed field image to another field image at predetermined time intervals.

Meanwhile, the elemental image array is a frame of image formed from a plurality of elemental images. Each elemental image is a component of an image, from which a stereoscopic view is created. Meanwhile, each elemental image includes images of a subject to be stereoscopically displayed. The images are captured from multiple viewpoints, and the number of the images corresponds to the number of the viewpoints. When an observer observes the elemental images through the parallax creating element 310, binocular parallax created by the parallax creating element 310 causes the observer to selectively observe, among the multiple-viewpoint images included in each of the elementary images, only images captured from a single viewpoint. Accordingly, the thus-sampled collection of the elemental images is perceived by the observer as a three-dimensional image formed at a predetermined position.

The number M, by which each frame is divided, is preferably N, which is the number of voltage value sets defined in the setting information 3221, alternatively, an integral multiple relation can stand between N and M. The time intervals for switching the field image are not specifically limited, however, preferably set to such time intervals that will not cause the observer to experience flicker.

Meanwhile, the power supply unit 321 supplies electric power to the electric loads of the directional backlight 100. The voltage controller 324 controls a portion of the power, i.e., the voltage values to be applied to the lower electrode 123 and the upper electrode 125 of the polarizing device unit 120, based on the setting information 3221 stored in the storage unit 322. Specifically, the voltage controller 324 applies voltages individually to the wiring patterns that form the lower electrode 123 and the upper electrode 125 while switching voltage values from one voltage value set to another among the N voltage value sets defined in the setting information 3221 at predetermined time intervals. In the third embodiment, the voltage values to be applied to the wiring patterns are switched in synchronization with the switching of the field image performed by the synchronization controller 323.

As described above, the voltage controller 324 applies voltages to the wiring patterns while switching the voltage application state among the N voltage application states at the predetermined time intervals. This time-division control causes the light rays emitted from the surface light source 110 and passing through the openings A and then through the LCD panel 210 to direct toward the N light convergence positions. Accordingly, the directions of the light rays emitted from the directional backlight 100 are switched at the predetermined time intervals, which allow to provide a sufficiently-broad viewing range at each of the light convergence positions.

Figure 21:
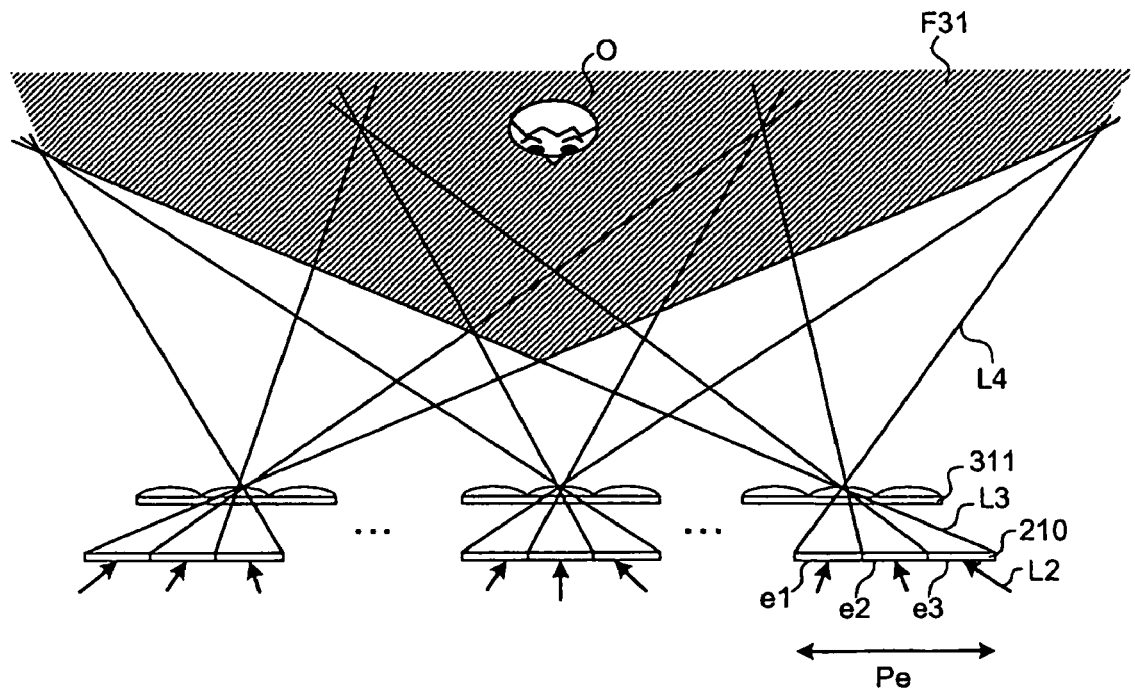
FIG. 21 is a schematic diagram illustrating relationships between the stereoscopic display apparatus and observers.

FIG. 21 depicts the parallax creating element 310 implemented with a lenticular plate 311. FIG. 21 depicts only a right end portion, a center portion, and a left portion of the stereoscopic display apparatus 300 (the same applies to FIGS. 22 to 24, 26, and 28 to 30).

Figure 22:
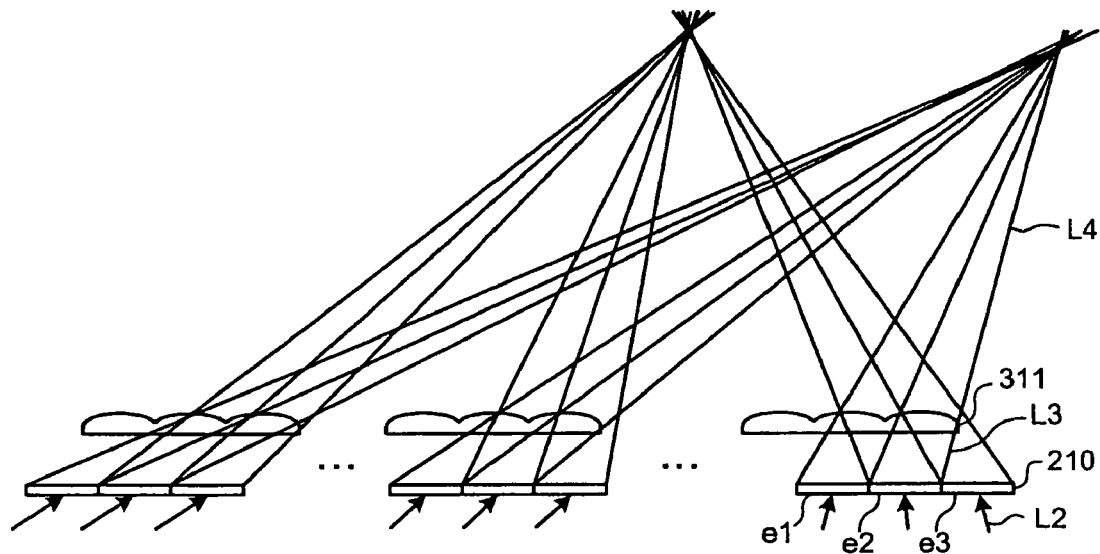
FIGS. 22 to 24 are schematic diagrams of transitions of directions of light rays.
Figure 23:
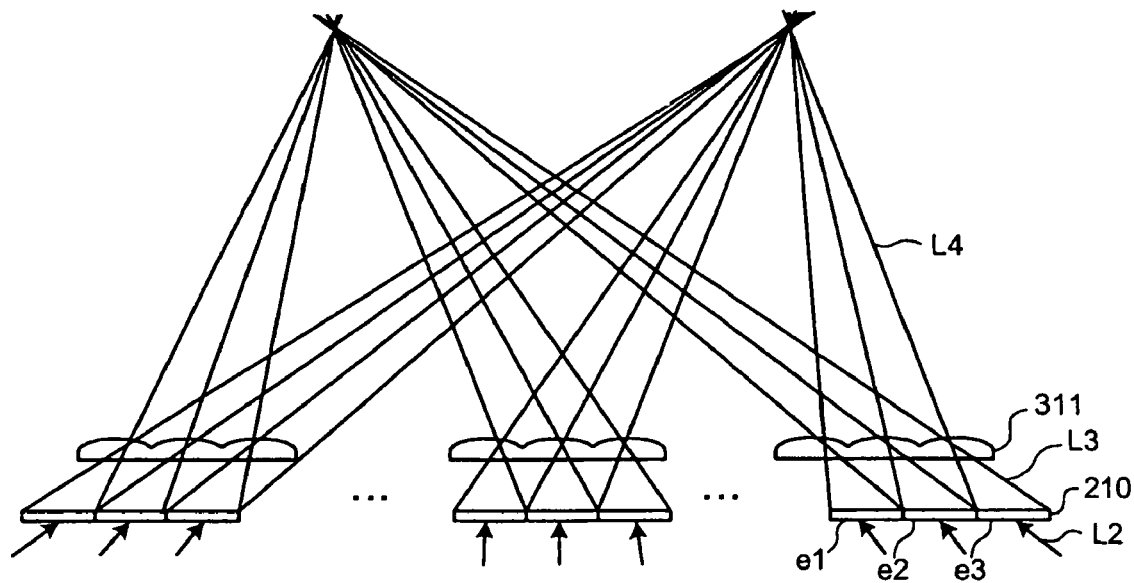
Figure 24:
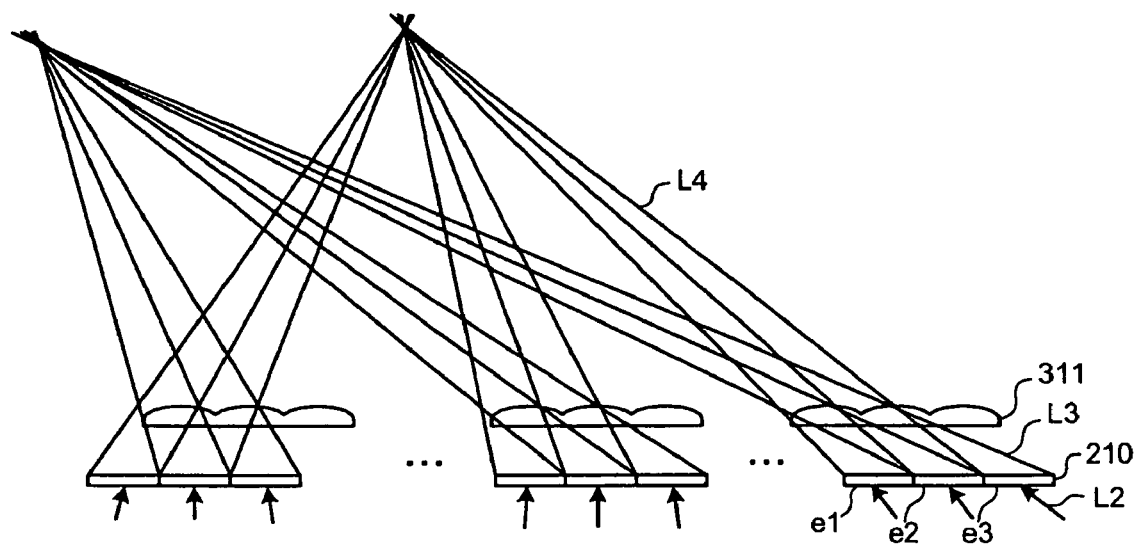
Figure 25:
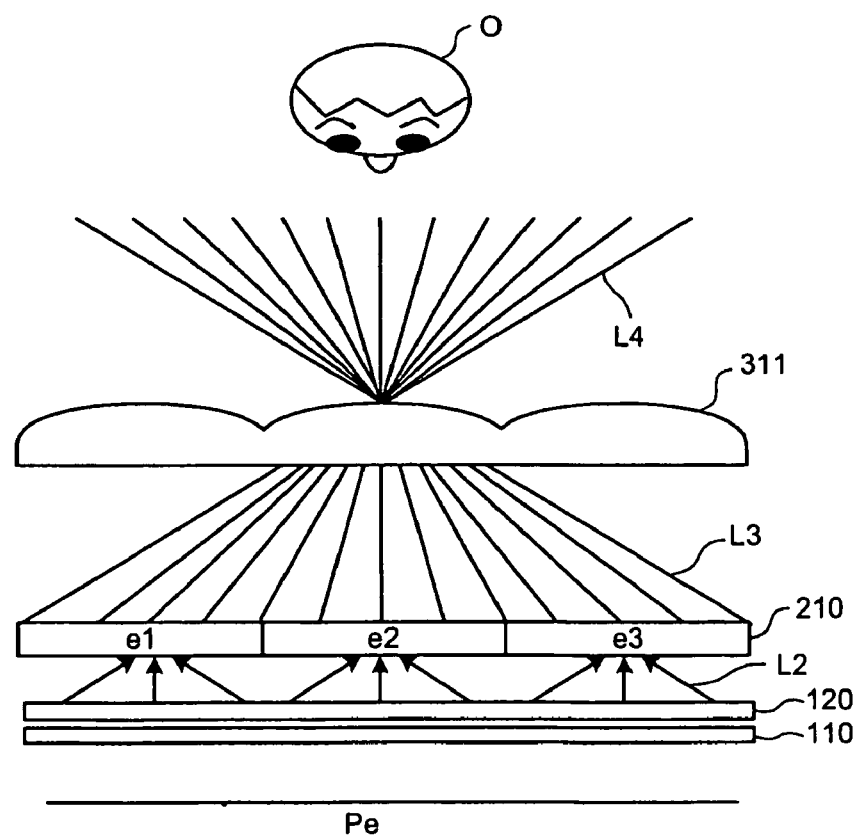
FIG. 25 is a schematic diagram illustrating loci of light rays passing through the stereoscopic display apparatus.

FIGS. 22 to 24 are schematic diagrams of transitions of light ray directions that are effected by the apparatus shown in FIG. 21 to display the field images. The directional backlight 100 is not shown in FIGS. 22 to 24. FIG. 25 depicts loci of light rays that pass through the image display surface at a position near the center of the surface of the apparatus shown in FIG. 21.

As shown in FIG. 21, the lenticular plate 311 adopted as the parallax creating element 310 is situated to face the image display face of the LCD panel 210. The LCD panel 210 and the lenticular plate 311 have pixel surfaces thereof on an image surface but not on a lens focal plane so that the light rays L3 (image light) emitted from the LCD panel 210 are projected through the lenticular plate 311. The diameter of the individual lenses of the lenticular plate 311 is an integral multiple of a size of the individual sub-pixels of the liquid crystal cell 212.

FIG. 21 depicts an example in which a frame of elemental image array is divided into three field images. Reference symbol Pe (hereinafter, "width Pe") in FIG. 21 denotes a length of an elemental image allocated to one of the lenses that form the lenticular plate 311. Any one of elemental images e1, e2, and e3 is projected on each of the lenses of the lenticular plate 311. A viewing range F31, within which the thus-projected image light can be observed, is provided by light rays L4 passed through the lenses of the lenticular plate 311. In FIG. 21, reference symbol L2 denotes the light rays emitted from the directional backlight 100.

Specifically, the voltage controller 324 controls incident angles (i.e., the deflection angle θ through the polarizing device unit 120) of the light rays L2 emitted from the directional backlight 100 in different N patterns for each of the elemental images e1, e2, and e3. The elemental images e1 to e3 is a unit corresponding to the width Pe. More specifically, as shown in FIGS. 22 to 24, the voltage controller 324 individually controls voltage values to be applied to the wiring patterns of the lower electrode 123 and the upper electrode 125 while switching the voltage values in N patterns at predetermined time intervals so that a light convergence position of the light rays L4 is switched according to timing of display of each of the field images.

Figure 26:
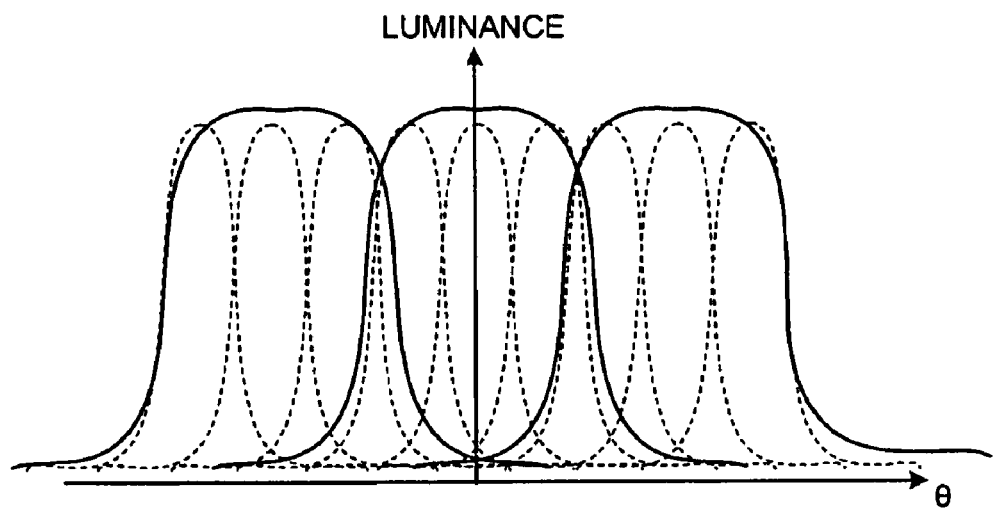
FIG. 26 is a diagram illustrating luminance distribution of light rays on a parallax creating element according to the third embodiment.

FIG. 26 depicts luminance distribution of light rays measured at the center portion of the parallax creating element 310. FIG. 26 depicts the luminance distributions of light rays obtained under a time-division control that is performed such that directions of the light rays are switched among three directions, and three views of different parallax angles are displayed in each direction, thereby displaying nine views of different parallax angles in total in the three directions.

As shown in FIG. 26, the time-division control of the light rays performed by the control device 320 yields a luminance peak of the light rays in each direction. Meanwhile, an overlapping area of the luminance distributions is small due to light emitting characteristics of the surface light source 110. Because the parallaxes created by the stereoscopic display apparatus 300 that displays three-dimensional imagery have a large crosstalk range, even when the luminance distributions have overlaps of a certain area, the overlaps do not significantly affect the three-dimensional imagery to be displayed.

The width Pe is determined based on properties of the stereoscopic display apparatus 300. For instance, in a stereoscopic display apparatus of a conventional configuration (see FIG. 27) that does not switch directions of light rays, the width Pe is determined by a distance over which an aperture center is projected from a viewing point onto the liquid crystal cell 212 based on a distance between the lenticular plate 311 and a light convergence position, a lens pitch of the lenticular plate 311, and a distance between the LCD panel 210 and the lenticular plate 311, and determined. The viewing point is on a viewing distance plane, on which the light convergence positions are placed.

In contrast, in the stereoscopic display apparatus 300 according to the third embodiment, the directions of light rays are switched in N patterns by time-division control. Therefore, the width Pe of this apparatus is N times greater than that of the conventional configuration, as shown in FIG. 21. Accordingly, the area of the viewing range F31 provided by the light rays L4 that pass through the lenses of the lenticular plate 311 can be increased to an area N times larger than that of the conventional configuration in which directions of light rays are not switched. FIG. 21 depicts the example, in which the directions of light rays are switched into three directions that differ from one another and accordingly the width Pe, which depend on the number of switching, is a total length of the three elemental images.

In the configuration of the stereoscopic display apparatus 300, the width Pe is N times a lens pitch between adjacent to lenses of the lenticular plate 311. When the lens pitch is decreased by a factor of N, resolution of image light viewed through the lenticular plate 311 can be increased by the factor of N. More specifically, when the lens pitch of the lenticular 311 in the configuration shown in FIG. 21 is reduced to one-third, the resolution of image light viewed through the lenticular plate 311 is tripled.

Meanwhile, the area of the viewing range F31 decreases as a gap between the lenticular plate 311 and the LCD panel 210 increases. However, as long as a pixel pitch of the liquid crystal cell 212 is unchanged, a light ray density of the light rays L4 emitted through a lens corresponding to each elemental image is increased. Consequently, an apparent depth of a stereoscopic image to be displayed is increased by the factor of N. More specifically, in the configuration shown in FIG. 21, the apparent depth of the stereoscopic image is tripled.

Figure 27:
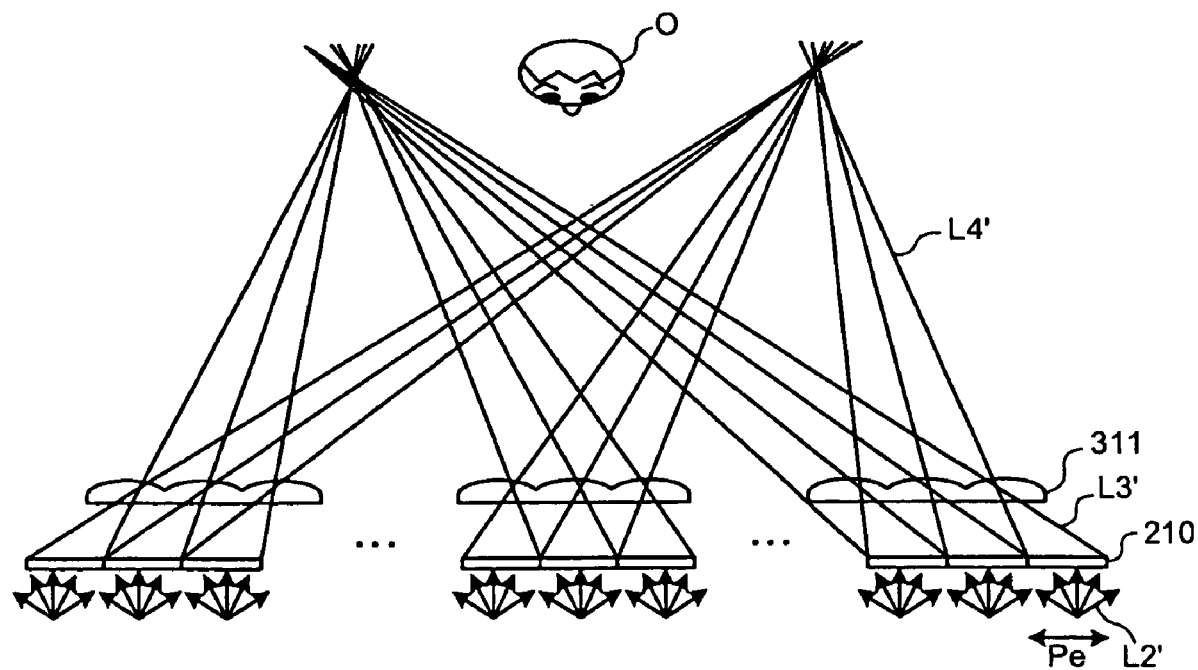
FIG. 27 is a schematic diagram illustrating relationships between a conventional stereoscopic display apparatus and observers.
Figure 28:
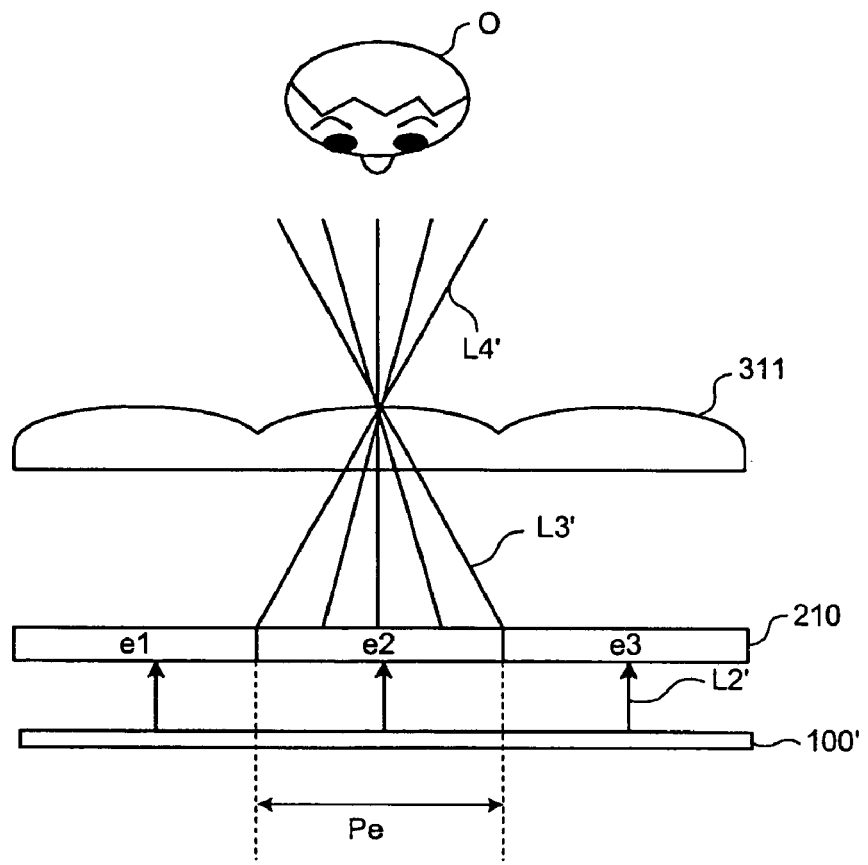
FIG. 28 is a schematic diagram illustrating loci of light rays passing through the conventional stereoscopic display apparatus.

FIGS. 27 and 28 depict a comparative example for the configuration shown in FIGS. 21 and 25. The configuration of the comparative example corresponds to the conventional stereoscopic display apparatus including a directional backlight 100' that does not perform a time-division control of directions of light rays. FIG. 27 depicts loci of light rays L2' that impinge on the LCD panel 210 at an angle of 0 degree from the normal, that is, the light rays L2' that are collimated are all emitted in one direction. FIG. 28 depicts loci of light rays that pass through the image display surface of the apparatus shown in FIG. 27 at a position near a center of the surface. Reference symbol L3' denotes light rays between the LCD panel 210 and the lenticular plate 311.

In a conventional stereoscopic display apparatus that does not perform a time-division control of light ray directions, the width Pe allocated to each lens of the lenticular plate 311 is as small as one-third of the width Pe of the apparatus according to the third embodiment shown in FIG. 21. Accordingly, as shown in FIG. 28, the light ray density of light rays L4' passing through the lenticular plate 311 is smaller than those of the light rays L4 shown in FIG. 25 by a ratio corresponding to the number of switching performed by the apparatus shown in FIG. 25.

As described above, according to the third embodiment, because the directions of the light rays emitted from the single surface light source can be switched, the number of directions of the light rays is increased. In addition, because the luminance distribution of the light rays emitted from the surface light source are concentrated close to the normal of the light emitting surface, a sufficiently-broad viewing range can be secured at each of the positions toward which the light rays direct, thereby increasing a total area of the viewing ranges. Hence, the stereoscopic display apparatus 300 according to the third embodiment allows to increase any one of the viewing range, resolution, and apparent depth in three-dimensional imagery to a value determined based on N, which is the number of switching performed by the apparatus 300, as compared with the conventional stereoscopic display apparatus that does not perform time-division control of directions of light rays.

The third embodiment has described the configuration in which the lenticular plate 311 is used as the parallax creating element 310. However, the parallax creating element 310 is not limited thereto, and another mode that causes the observer C to observe views with parallax using another optical element can be employed.

Figure 29:
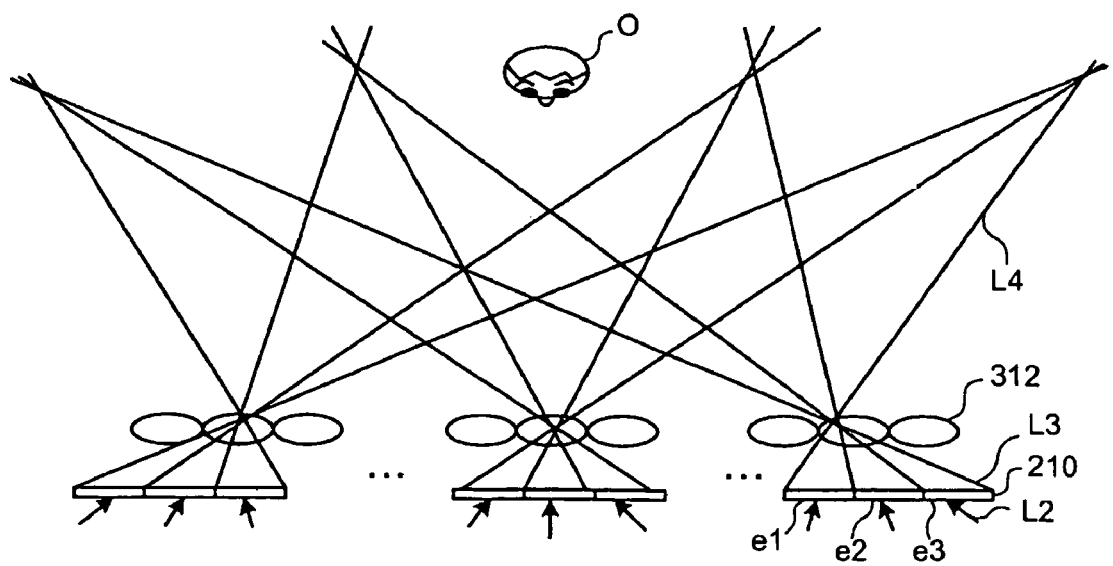
FIGS. 29 to 31 are schematic diagrams illustrating relationships between the stereoscopic display apparatus according to the third embodiment and an observer.

For instance, as shown in FIG. 29, a fly eye's lens 312 can be used as the parallax creating element 310. The diameter of each lens of the fly eye's lens 312 is preferably an integral multiple of size of each of the sub-pixels that form the image display surface of the liquid crystal cell 212.

In the apparatus configured as shown in FIG. 29, voltage values to be applied to the wiring patterns of the lower electrode 123 and the upper electrode 125 are individually controlled to cause light rays to deflect horizontally and vertically, thereby creating parallaxes in the vertical direction. However, it is required to increase N, which is the number by which each frame is divided, in number to control the directions of the light rays in the horizontal and vertical directions. To satisfy this requirement, it is necessary that each of the polarizing plate 211, the liquid crystal cell 212, and the polarizing plate 213 is highly responsive.

Figure 30:
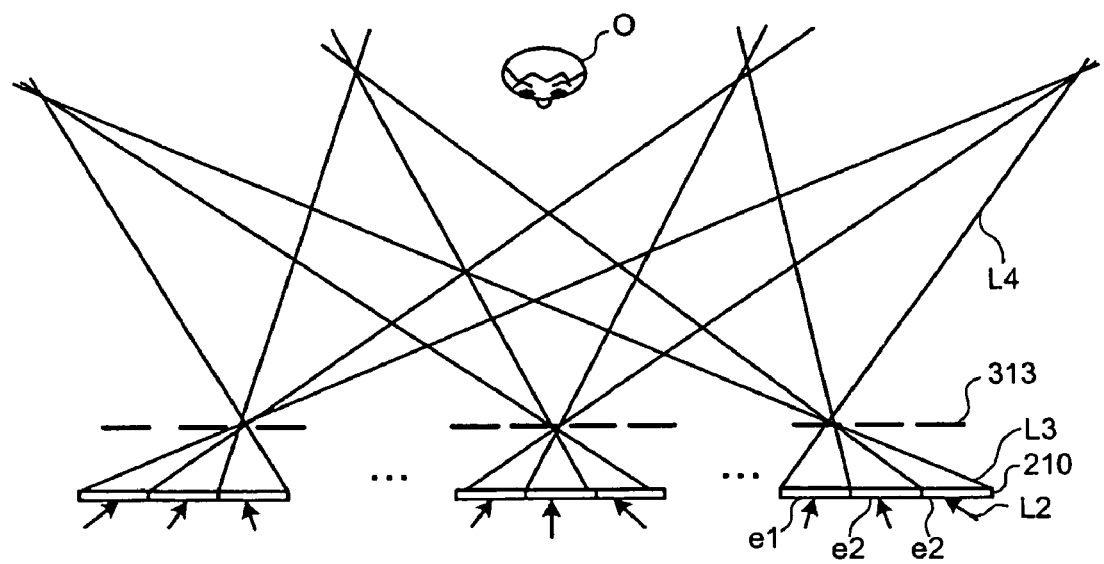
Figure 31:
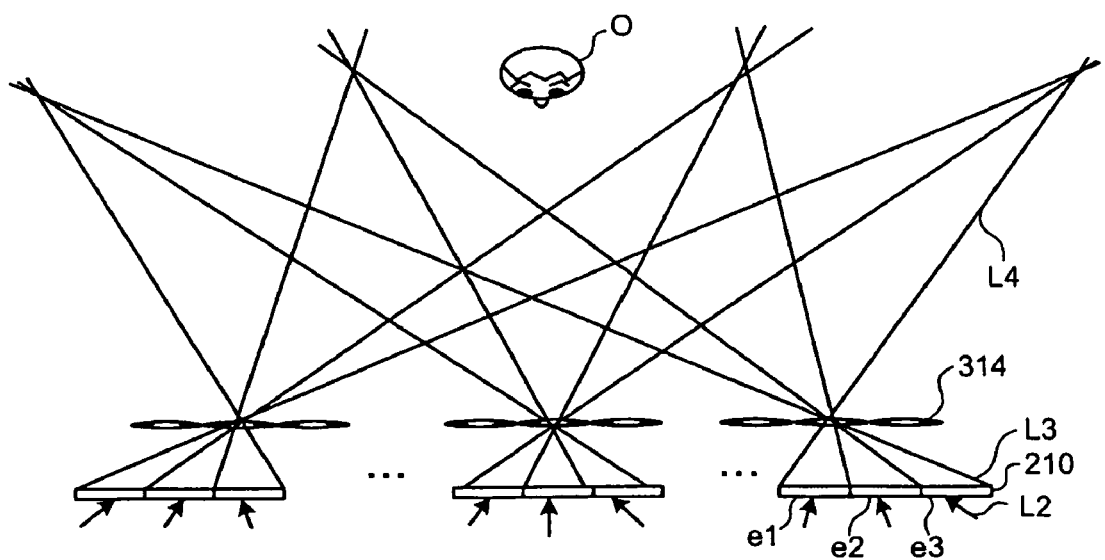

As alternative configurations, as shown in FIGS. 30 and 31, any one of a slit array 313 and a pinhole array 314 can be used as the parallax creating element 310. However, these alternative configurations are disadvantageous in that the light quantity decreases. A gap between adjacent two slits of the slit array 313 is preferably an integral multiple of a size of each of the sub-pixels that form the image display surface of the liquid crystal cell 212. A diameter of each pinhole of the pinhole array 314 is preferably an integral multiple of a size of each of the sub-pixels that form the image display surface of the liquid crystal cell 212.

While exemplary embodiments of the present invention have been described above, the present invention is not limited thereto, and various modifications, substitutions, and additions can be made without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A directional backlight comprising:
    a surface light source having a characteristic that luminance distribution of light rays emitted from a light-emitting surface of the surface light source are concentrated close to the normal direction of the light-emitting surface;
    a polarizing device unit that includes
        a first transparent substrate that faces the light emitting surface of the surface light source,
        a second transparent substrate that faces the first transparent substrate,
        a pair of electrodes that are formed between the first transparent substrate and the second transparent substrate, the electrodes having wiring patterns arranged in stripes,
        a liquid crystal layer retained between the electrodes, and
        a light-shielding layer that is provided on the second transparent substrate and has a plurality of openings corresponding to the wiring patterns of the electrodes, wherein the openings defined in the light-shielding layer are smaller in size than sub-pixels that form a display pixel of a liquid-crystal display device that faces the polarizing device unit; and
    a voltage controller that switches a voltage application state of the wiring patterns of the electrodes among a plurality of voltage application states and individually controls values of voltages to be applied to the wiring patterns in the voltage applications states, thereby controlling a direction of light rays emitted from the surface light source and passing through the openings toward a predetermined position.

2. The directional backlight according to claim 1, wherein one of the pair of electrodes having the wiring patterns arranged in stripes and the other of the pair of electrodes having the wiring patterns arranged in stripes are formed such that the stripes of the electrodes extend perpendicular to each other.

3. The directional backlight according to claim 1, wherein the voltage controller individually controls the values of voltages to be applied to the wiring patterns of the electrodes according to the predetermined position.

4. A display apparatus comprising:
    a surface light source having a characteristic that luminance distribution of light rays emitted from a light-emitting surface of the surface light source are concentrated close to the normal direction of the light-emitting surface;
    a polarizing device unit that includes
        a first transparent substrate that faces the light emitting surface of the surface light source,
        a second transparent substrate that faces the first transparent substrate,
        a pair of electrodes that are formed between the first transparent substrate and the second transparent substrate, the electrodes having wiring patterns arranged in stripes,
        a liquid crystal layer retained between the electrodes, and
        a light-shielding layer that is provided on the second transparent substrate and has a plurality of openings corresponding to the wiring patterns of the electrodes;
    a liquid-crystal display device that faces the polarizing device unit and displays a frame of image divided into a plurality of field images on display pixels arranged in a matrix, the liquid-crystal display device comprising sub-pixels that form a display pixel;
    a synchronization controller that performs switching of the field images displayed on the liquid-crystal display device to another field image at predetermined time intervals; and
    a voltage controller that switches a voltage application state of the wiring patterns of the electrodes among a plurality of voltage application states according to timing of the switching performed by the synchronization controller, and individually controls values of voltages to be applied to the wiring patterns in the voltage applications states, thereby controlling a direction of light rays emitted from the surface light source and passing through the openings and then through the liquid-crystal display device toward a predetermined position,
    wherein the openings defined in the light-shielding layer are smaller in size than the sub-pixels.

5. The apparatus according to claim 4, wherein one of the pair of electrodes having the wiring patterns arranged in stripes and the other of the pair of electrodes having the wiring patterns arranged in stripes are formed such that the stripes of the electrodes extend perpendicular to each other.

6. The apparatus according to claim 4, wherein the voltage controller individually controls the values of voltages to be applied to the wiring patterns of the electrodes according to the predetermined position.

7. The apparatus according to claim 4, wherein the voltage controller controls the number of the voltage application states according to the number of the field images.

8. The apparatus according to claim 4, wherein
    the synchronization controller performs switching between a field image for a left eye and a field image for a right eye displayed on the liquid-crystal display device at predetermined time intervals; and
    the voltage controller switches the voltage application state between two voltage application state states in synchronization with the switching performed by the synchronization controller.

9. A stereoscopic display apparatus, comprising:
    a surface light source having a characteristic that luminance distribution of light rays emitted from a light-emitting surface of the surface light source are concentrated close to the normal of the light-emitting surface;

a polarizing device unit that includes
- a first transparent substrate that faces the light emitting surface of the surface light source,
- a second transparent substrate that faces the first transparent substrate,
- a pair of electrodes that are formed between the first transparent substrate and the second transparent substrate, the electrodes having wiring patterns arranged in stripes,
- a liquid crystal layer retained between the electrodes, and
- a light-shielding layer that is provided on the second transparent substrate and has a plurality of openings corresponding to the wiring patterns of the electrode;

a liquid-crystal display device that faces the polarizing device unit and displays an elemental image array for rendering stereoscopic display formed from a plurality of field images on display pixels arranged in a matrix, the liquid-crystal display device comprising sub-pixels that form a display pixel;

a parallax creating unit provided on any one of a front surface and a rear surface of the liquid-crystal display device; and a voltage controller that switches a voltage application state of the wiring patterns of the electrodes among a plurality of voltage application states according to a display of the field image, and individually controls values of voltages to be applied to the wiring patterns in the voltage applications states, thereby controlling a direction of light rays emitted from the surface light source and passing through the openings, through the liquid-crystal display device, and then through the parallax creating unit toward a predetermined position, wherein the openings defined in the light-shielding layer are smaller in size than the sub-pixels.

10. The apparatus according to claim 9, wherein one of the pair of electrodes having the wiring patterns arranged in stripes and the other of the pair of electrodes having the wiring patterns arranged in stripes are formed such that the stripes of the electrodes extend perpendicular to each other.

11. The apparatus according to claim 9, wherein the voltage controller individually controls the values of voltages to be applied to the wiring patterns of the electrodes according to the predetermined position.

12. The apparatus according to claim 9, wherein
the parallax creating unit is a lenticular plate formed from lenses; and
a width of each of the lenses is an integral multiple of a size of each of sub-pixels that form the display pixel.

13. The apparatus according to claim 9, wherein
the parallax creating unit is a slit array having slits; and
a gap between each adjacent two of the slits is an integral multiple of a size of each of sub-pixels that form the display pixel.

14. The apparatus according to claim 9, wherein
the parallax creating unit is fly eye's lens; and
a diameter of each lens of the fly eye's lens is an integral multiple of a size of each of sub-pixels that form the display pixel.

15. The apparatus according to claim 9, wherein
the parallax creating unit is a pinhole array having pinholes; and
a diameter of each pinholes of the pinhole array is an integral multiple of a size of each of sub-pixels that form the display pixel.

* * * * *